(12) United States Patent
Song et al.

(10) Patent No.: US 12,485,170 B2
(45) Date of Patent: Dec. 2, 2025

(54) LIPID COMPOSITION TARGETING ANTIGEN-PRESENTING CELLS AND USE THEREOF

(71) Applicant: Beijing Youcare Kechuang Pharmaceutical Technology Co., Ltd., Beijing (CN)

(72) Inventors: Gengshen Song, Beijing (CN); Honglei Zhang, Beijing (CN); Yuting Zhou, Beijing (CN); Lijie Jin, Beijing (CN); Jinyu Zhang, Beijing (CN); Kai Dong, Beijing (CN); Huanyu Wang, Beijing (CN); Xiaowen Yu, Beijing (CN)

(73) Assignee: Beijing Youcare Kechuang Pharmaceutical Technology Co., Ltd., Beijing (CN)

( * ) Notice: Subject to any disclaimer, the term of this patent is extended or adjusted under 35 U.S.C. 154(b) by 0 days.

(21) Appl. No.: 19/048,826

(22) Filed: Feb. 7, 2025

(65) Prior Publication Data
US 2025/0312443 A1    Oct. 9, 2025

(30) Foreign Application Priority Data

Apr. 9, 2024   (CN) .......................... 202410420862.3

(51) Int. Cl.
*A61K 39/39* (2006.01)
*A61K 47/54* (2017.01)
*A61K 48/00* (2006.01)
*A61K 39/00* (2006.01)

(52) U.S. Cl.
CPC ............ *A61K 39/39* (2013.01); *A61K 47/544* (2017.08); *A61K 47/545* (2017.08); *A61K 48/0033* (2013.01); *A61K 2039/53* (2013.01); *A61K 2039/55555* (2013.01)

(58) Field of Classification Search
None
See application file for complete search history.

(56) References Cited

U.S. PATENT DOCUMENTS

| | | |
|---|---|---|
| 2005/0222064 A1 | 10/2005 | Vargeese et al. |
| 2008/0088046 A1 | 4/2008 | Panzner |
| 2008/0311181 A1 | 12/2008 | Endert et al. |
| 2023/0053437 A1 | 2/2023 | Ying |

FOREIGN PATENT DOCUMENTS

| | | |
|---|---|---|
| CN | 109331176 A | 2/2019 |
| CN | 112930198 A | 6/2021 |
| CN | 112996519 A | 6/2021 |
| CN | 114044741 B | 4/2022 |
| CN | 109331176 B | 12/2022 |
| CN | 115845040 A | 3/2023 |
| CN | 115784921 B | 5/2023 |
| WO | 2011140627 A1 | 11/2011 |
| WO | 2020051220 A1 | 3/2020 |
| WO | 2020051223 A1 | 3/2020 |
| WO | 2022136266 A1 | 6/2022 |
| WO | 2022152141 A2 | 7/2022 |

OTHER PUBLICATIONS

Kranz, L., Diken, M., Haas, H. et al. Systemic RNA delivery to dendritic cells exploits antiviral defence for cancer immunotherapy. Nature 534, 396-401 (2016). (Year: 2016).*
Cheng, Q., Wei, T., Farbiak, L. et al. Selective organ targeting (SORT) nanoparticles for tissue-specific mRNA delivery and CRISPR-Cas gene editing. Nat. Nanotechnol. 15, 313-320 (2020) (Year: 2020).*
Y. Jia, X. Wang, L. Li, F. Li, J. Zhang, X.-J. Liang, Lipid Nanoparticles Optimized for Targeting and Release of Nucleic Acid. Adv. Mater. 2024, 36, 2305300 (Year: 2024).*
May 13, 2024 1st Chinese Office Action issued in Chinese Patent Application No. 202410420862.3.
May 11, 2024 Chinese Search Report issued in Chinese Patent Application No. 202410420862.3.
Jun. 14, 2024 Supplementary Chinese Search Report issued in Chinese Patent Application No. 202410420862.3.
Templeton, N. S. et al., Improved DNA: liposome complexes for increased systemic delivery and gene expression, Nature Biotechnology, 1997, 15(7): 647-652.
Zhdanov, R. I. et al., Cationic lipid-DNA complexes-lipoplexes-for gene transfer and therapy, Bioelectrochemistry, 2002, 58(1): 53-64.
Templeton, N. S. et al., Cationic Liposomes as In Vivo Delivery Vehicles, Current Medicinal Chemistry, 2003, 10(14): 1279-1287.
Aristides D. Tagalakis et al., Integrin-Targeted, Short Interfering RNA Nanocomplexes for Neuroblastoma Tumor-Specific Delivery Achieve MYCN Silencing with Improved Survival, Advanced Functional Materials, 2021, 31, 2104843.
S. Tahtinen et al., IL-1 and IL-1ra are key regulators of the inflammatory response to RNA vaccines, Nat Immunol., 2022, 23(4): 532-542.
Lena M. Kranz et al., Systemic RNA delivery to dendritic cells exploits antiviral defence for cancer immunotherapy, Nature, 2016, 534, 396-401.
Remington: The Science and Practice of Pharmacy, 21st Edition, A. R. Gennaro; Lippincott, Williams&Wilkins, Baltimore, MD, 2006.
Yuexiao Hu, A Novel mRNA Delivery System of Degradable Lipid, Mar. 2023.

(Continued)

*Primary Examiner* — Brian Whiteman
*Assistant Examiner* — Khaleda B Hasan

(57) ABSTRACT

The present disclosure relates to the technical field of molecular biology and provides a lipid composition targeting antigen-presenting cells and a use thereof. The composition provided by the present disclosure demonstrates good organ and cell targeting specificity, significantly enhancing the protein expression level of antigens in the spleen. Additionally, the composition significantly increases the percentage of cells that express the antigen among antigen-presenting cells (e.g., B cells, pDC cells, cDC cells, and macrophages) in the spleen, indicating that the composition can be used in the immunotherapy of diseases.

20 Claims, 8 Drawing Sheets

(56) References Cited

OTHER PUBLICATIONS

Rafaela R. M. Cavalcanti et al., Efficient liposome fusion to phase-separated giant vesicles, Biophysical Journal, 2022, 122(11), 2099-2111.
Jun. 19, 2024 Notice of Allowance issued in Chinese Patent Application No. 202410420862.3.
Jul. 20, 2025 First Office Action issued in Korean Patent Application No. 10-2025-0040352.
Sep. 16, 2025 First Office Action issued in Israeli Patent Application No. 319183.
Sep. 11, 2025 First Office Action issued in Eurasian Patent Application No. 202590880.
Oltarzhevskaya N.D. et al., Methods of Drug Delivery in the Treatment of Oncological Diseases, Biomedical Chemistry: Research and Methods, 2019, vol. 2, No. 1, 11 p.

* cited by examiner

No. 8

Lung

Liver

Spleen

No. 17

Fluorescence intensity p/s/cm2/sr

Lung

Liver

Spleen

Fluorescence intensity p/s/cm2/sr

LIPID COMPOSITION TARGETING ANTIGEN-PRESENTING CELLS AND USE THEREOF

CROSS-REFERENCE TO RELATED APPLICATION

The present application claims priority from Chinese Patent Application No. 202410420862.3 filed on Apr. 9, 2024, the contents of which are incorporated herein by reference in their entirety.

TECHNICAL FIELD

The present disclosure belongs to the technical field of molecular biology and relates to a lipid composition targeting antigen-presenting cells and a use thereof.

BACKGROUND

Expressing tumor antigens in antigen-presenting cells (APCs) through encoding mRNA to induce T cell responses against tumors has significant potential in tumor immunotherapy. Since negatively charged mRNA molecules cannot directly enter antigen-presenting cells, and most existing delivery technologies inevitably deliver large amounts of mRNA to the liver and lung. For immunotherapy, an immune response in the lung or liver is typically detrimental. Therefore, a critical issue determining the success of mRNA immunotherapy is to deliver mRNA encoding specific antigens to antigen-presenting cells (APCs) with high selectivity.

Using lipid compositions to encapsulate mRNA and form lipid-RNA compositions is one of the more commonly used methods for introducing mRNA into cells in mRNA immunotherapy. Currently, the lipid systems developed by researchers for lipid-RNA compositions mainly include:

1. Lipid nanoparticles (LNPs) are spherical vesicles composed of one (unilamellar) or multiple (multilamellar) phospholipid bilayers. The LNP delivery technology encapsulates mRNA within lipid nanoparticles composed of four components: cationic lipids (e.g., DLin-MC3-DMA, C12-200), neutral lipids (e.g., DSPC, DOPE), structural lipids (e.g., cholesterol), and polymer-conjugated lipids (e.g., DMG-PEG2000). Among them, cationic lipids include permanently cationic lipids (containing quaternary ammonium groups) and ionizable cationic lipids (containing primary, secondary, or tertiary amine groups). Due to the increased toxicity to cells caused by LNPs prepared with permanently cationic lipids, ionizable cationic lipids are employed as a substitute.

By adding a fifth lipid (selective organ-targeting SORT lipid) to traditional four-component liver-targeting lipid nanoparticles, the organ-targeting specificity of mRNA drugs may be achieved. For example, CN112996519A records a composition that comprises a therapeutic agent and a lipid nanoparticle composition, wherein the lipid nanoparticle composition comprises: 1) an ionizable cationic lipid, a phospholipid (i.e., neutral lipid), a steroid (i.e., structural lipid, including cholesterol), a polyethylene glycol-conjugated lipid (i.e., polymer-conjugated lipid, including dimyristoyl-sn-glycerol), and a permanently cationic lipid (i.e., liver-targeting SORT lipid); or 2) an ionizable cationic lipid, a phospholipid (i.e., neutral lipid), a steroid (i.e., structural lipid, including cholesterol), a polyethylene glycol-conjugated lipid (i.e., polymer-conjugated lipid, including dimyristoyl-sn-glycerol), and a permanently anionic lipid (i.e., spleen-targeting SORT lipid). This further alters the apparent pKa of the selective organ-targeting compound contained in the lipid nanoparticle composition, thereby regulating the targeting effect of the resulting composition preparation on different organs.

2. Lipopolyplex (LPP) is a bilayer structure with polymer-encapsulated mRNA as the core and an outer shell encapsulated with phospholipid. Negatively charged mRNA condenses within the positively charged polymer, forming a compact polyplex "core" structure with diameters ranging from several nanometers to hundreds of nanometers. The bilayer nanostructure of LPP offers better encapsulation and protection of mRNA compared to traditional LNPs and is capable of gradually releasing mRNA molecules as the polymer degrades. Additionally, its excellent dendritic cell targeting specificity can more effectively activate T cell immune responses through antigen presentation, achieving the desired immunotherapeutic effect.

For example, CN115845040A records a lipid polyplex mRNA vaccine composed of a core of poly(β-amino ester) polymer mRNA encapsulated in a lipid shell of 1,2-dioleoyl-sn-glycerol-3-ethylphosphocholine/1,2-dioleoyl-sn-glycerol-3-phosphatidylethanolamine/1,2-distearoyl-sn-glycerol-3-phosphoethanolamine-N-[amino (polyethylene glycol)-2000] (permanently cationic lipid EDOPC/neutral lipid DOPE/auxiliary lipid DSPE-PEG). In the aforementioned shell/core mRNA vaccine, the hydrophilic phospholipid bilayer "shell" encapsulates the polyplex core, and the shell not only enhances the uptake by dendritic cells but also protects the mRNA molecules inside the core from degradation by cellular nucleases. Additionally, an effective approach to enhance the uptake of vaccine particles by dendritic cells is also described therein: the mRNA vaccine is conjugated with affinity components (e.g., saccharide moieties such as mannose, binding proteins, or antibodies specific to one or more DC-expressed epitopes) in the surface of the lipid shell to "functionalize", which enhances the interaction between the vaccine particles and the antigen-presenting cells targeted by the vaccine core/shell complex (e.g., dendritic cells, macrophages, and B cells) and/or enhances their binding.

3. Lipoplex (LPX) is a complex delivery carrier developed by BioNTech, formed from cationic lipids and neutral auxiliary lipids, with mRNA molecules embedded between the lipid bilayers. For example, CN 109331176 A disclosed that lipoplexes can be formed from permanently cationic (positively charged) lipids and anionic (negatively charged) nucleic acids, and neutral lipids can also be added as auxiliary lipids. By optimizing the ratio of lipids to RNA in RNA-lipoplexes (RNA-LPX), the net charge of the preparation composition is adjusted to neutral or negative, which following intravenous injection allows for precise targeting of dendritic cells (DC cells) without the need for modifications to the targeting specificity of nanoparticles.

In the simplest case, lipoplexes are spontaneously formed by mixing nucleic acids with liposomes through a certain mixing scheme, but various other schemes can also be applied. The electrostatic interaction between positively charged liposomes and negatively charged nucleic acids is the driving force for the formation of lipoplexes. In addition to the lipid components, the charge ratio between the cationic and anionic parts also plays an important role in effective condensation and transfection. Generally, an excess of positive charge in lipoplexes is considered necessary for effective transfection (Templeton, N. S. et al., (1997) Nature Biotechnology 15 (7): 647-652; Zhdanov, R. I. et al., (2002) Bioelectrochemistry 58 (1): 53-64; Templeton, N. S. (2003)

Current Medicinal Chemistry 10 (14): 1279-1287). Most natural membranes are negatively charged, and the electrostatic attraction between positively charged lipoplexes and negatively charged biological membranes may play a role in cell binding and the uptake of lipoplexes. Conversely, if there is a lower excess of positive charge, transfection efficiency is greatly reduced or almost zero. However, based on high cytotoxicity of the reported positively charged liposomes and lipoplexes, their application as pharmaceuticals faces certain problems.

It has been confirmed that the aforementioned lipoplexes may achieve transfection in multiple organs, with the expression distribution in specific organs depending on various parameters, such as preparation and administration parameters (lipid composition, size, administration route). To date, it has not been fully possible to achieve selective expression in designated target organs or specific cell populations while avoiding expression in non-target organs. It has been reported that transfection has been carried out in organs such as the lung, liver, spleen, kidney, and heart using luciferase DNA or RNA as a reporter. However, avoiding targeting the lung and liver is particularly difficult, as in many cases, targeting the lung and liver tends to dominate. The lung has a very large surface and it is the first organ through which a compound injected intravenously (i.v.) passes after administration. The liver is a typical target organ for liposomes and preparations with lipophilic compounds (such as the lipids present in lipoplexes). For RNA-based immunotherapy, targeting the lung or liver may be harmful due to the risk of immune responses in these organs. Therefore, for such treatments, preparations with high selectivity only for dendritic cells (e.g., in the spleen) are needed.

Certain ligands are considered to be capable of improving targeting selectivity. For example, conjugation modifications (including mannose, etc.) on lipids can significantly increase the targeting specificity of macrophages. However, conjugation modifications on lipids need to take into account interactions with serum and RNA degradation in serum. Such components complicate the preparation, making the actual drug development more difficult.

Additionally, it has also been found that large aggregates are often observed during the incubation of RNA with cationic liposomes, leading to significantly increased particle size and reduced stability of the aggregates. This is a major obstacle in developing acceptable composition preparations suitable for intravenous or subcutaneous administration.

"Integrin-Targeted, Short Interfering RNA Nanocomplexes for Neuroblastoma Tumor-Specific Delivery Achieve MYCN Silencing with Improved Survival", Adv. Funct. Mater. 2021, 31, 2104843, disclosed a multifunctional cationic and anionic siRNA nanoparticle preparation, referred to as receptor-targeted nanocomplexes (RTNs). It comprises a lipid composition (containing permanently anionic lipid DOPG, permanently cationic lipid DOTMA, neutral lipid DOPE, and DPPE-PEG2000), as well as a polypeptide for siRNA encapsulation and receptor-mediated cellular uptake. After intravenous injection of RTNs into mice, the RTNs mainly accumulated in xenograft tumors and were scarcely detected in the liver, lung, or spleen, indicating that the RTN preparation may achieve specific tumor targeting with minimal liver clearance, thereby achieving siRNA-targeted drug therapy against tumors (see abstract and right column of page 9).

"IL-1 and IL-1ra are key regulators of the inflammatory response to RNA vaccines", Siri Tahtinen et al., Nature Immunology, Vol. 23, April 2022, 532-542, took RNA-LPX vaccines encoding TLR7/8 agonists as the example (in which RNA-LPX lipid composition includes DOTMA and DOPE at a (+):(−) charge ratio of 1.3:2, see paragraph 3 in the left column on page 543), and studied the factors influencing the induction of IL-1 cytokines production by the vaccines, such as number of monocytes, inflammasomes, and caspase activity.

"Systemic RNA delivery to dendritic cells exploits antiviral defence for cancer immunotherapy", Lena M. Kranz et al., Nature, Volume 534, 396-401 (2016) disclosed an RNA-LPX comprising cationic liposomes composed of DOTMA and DOPE, in which the effects of positive and negative charges on the targeting specificity of antigen-presenting cells in vivo were studied by changing the ratio of lipids and RNA. When the RNA-LPX carries a small amount of positive charge or is near neutral (with a positive-to-negative charge ratio of 2.5:1 to 1.8:2), the prepared RNA-LPX is unstable and will immediately form large aggregates. When Luc-RNA-LPX is positively charged (with a positive-to-negative charge ratio of 5:1), protein expression is concentrated in the lung of mice, with less expression in the spleen. As the cationic lipid content decreases, protein expression shifts from the lung to the spleen. For near-neutral and negatively charged particles (charge ratio of 1.7:2 or ≤1.7:2), protein expression shifts to the spleen. Additionally, as the negative charge increases, transfection efficiency gradually decreases, which, as recorded in the article, may be due to the increased of free RNA (see page 396, right column).

Due to the existing issues in the prior art, as well as the technical advances in large-scale cancer genome sequencing and predicting immunogenic tumor mutations, new tumor-associated antigens are being continually identified. This provides unprecedented opportunities for the development of new and improved therapeutic tumor vaccines. There is an urgent need for a new pathway for the highly selective delivery of mRNA to antigen-presenting cells, while ensuring that the injectable RNA preparations meet the product standards required for administration to patients.

CONTENT OF THE PRESENT INVENTION

The present disclosure provides a lipid composition targeting antigen-presenting cells and a use thereof.

The composition provided by the present disclosure results in high expression of RNA in the spleen (particularly in antigen-presenting cells) following systemic administration, while resulting in low expression in other organs (e.g., liver, lung), demonstrating good targeting specificity. Furthermore, the administration of the composition may induce a strong immune response against the antigen. Although an excess of positive charge is generally considered a prerequisite for successful uptake and expression, the composition with the charge ratio described in the present disclosure still achieves expression levels high enough to provide therapeutic efficacy of the lipoplexes following systemic administration.

To achieve the above objects, a first aspect of the present disclosure provides a lipid composition comprising:
(1) a permanently anionic lipid;
(2) a permanently cationic lipid;
(3) a neutral lipid;
wherein the molar ratio of the permanently anionic lipid, the permanently cationic lipid, and the neutral lipid in the lipid composition is (14 to 33):(40 to 57):(22 to 40).

A preferred embodiment according to the present disclosure, wherein the permanently anionic lipid comprises a phosphate group.

A preferred embodiment according to the present disclosure, wherein the permanently cationic lipid comprises a quaternary ammonium group.

A preferred embodiment according to the present disclosure, wherein the permanently comprises a phosphate group and/or a quaternary ammonium group.

A preferred embodiment according to the present disclosure, wherein the permanently anionic lipid is selected from any one or more of the following: 2-acetamidoethyl ((R)-2,3-bis(oleoyloxy) propyl) phosphate, (Z)—(R)-3-(phosphonooxy) propane-1,2-diyl dioleate, 1,2-dioleoyl-sn-glycero-3-phospho-rac-glycerol, or salts thereof.

A preferred embodiment according to the present disclosure, wherein the permanently cationic lipid is selected from any one or more of the following:
1,2-di-O-octadecenyl-3-trimethylammonium propane, 1,2-dioleoyl-3-trimethylammonium-propane, or salts thereof.

A preferred embodiment according to the present disclosure, wherein the neutral lipid is selected from:
1,2-dioleoyl-sn-glycero-3-phosphoethanolamine, and/or distearoylphosphatidylcholine, or salts thereof.

A preferred embodiment according to the present disclosure, wherein the lipid composition comprises:
(1) 25 mol % of the permanently anionic lipid;
(2) 50 mol % of the permanently cationic lipid; and
(3) 25 mol % of the neutral lipid;
or, the lipid composition comprises:
(1) 20 mol % of the permanently anionic lipid;
(2) 40 mol % of the permanently cationic lipid; and
(3) 40 mol % of the neutral lipid;
or, the lipid composition comprises:
(1) 14 mol % of the permanently anionic lipid;
(2) 57 mol % of the permanently cationic lipid; and
(3) 29 mol % of the neutral lipid;
or, the lipid composition comprises:
(1) 33 mol % of the permanently anionic lipid;
(2) 45 mol % of the permanently cationic lipid; and
(3) 22 mol % of the neutral lipid.

A second aspect of the present disclosure provides a use of a lipid composition in enhancing the targeting specificity of antigen-presenting cells in target organs, wherein the lipid composition comprises:
(1) a permanently anionic lipid;
(2) a permanently cationic lipid;
(3) a neutral lipid;
wherein the molar ratio of the permanently anionic lipid, the permanently cationic lipid, and the neutral lipid in the lipid composition is (14 to 33):(40 to 57):(22 to 40).

According to the present disclosure, the lipid composition is the lipid composition described in the first aspect, and its characteristics are as previously described and will not be repeated here.

A third aspect of the present disclosure provides a composition comprising:
(A) a therapeutic and/or prophylactic agent comprising one or more of nucleic acid molecules, small molecule compounds, polypeptides, or proteins;
(B) the lipid composition according to the first aspect;
the composition is used to deliver the therapeutic and/or prophylactic agent to antigen-presenting cells in target organs.

A preferred embodiment according to the present disclosure, wherein the therapeutic and/or prophylactic agent is a nucleic acid molecule capable of encoding one or more antigens.

A preferred embodiment according to the present disclosure, wherein the antigen is a disease-associated antigen, or the nucleic acid molecule or antigen is capable of eliciting an immune response against disease-associated antigens or cells expressing disease-associated antigens.

A preferred embodiment according to the present disclosure, wherein the target organ is selected from any one or more of the following: spleen, liver, or lung.

A preferred embodiment according to the present disclosure, wherein the target organ is spleen.

A preferred embodiment according to the present disclosure, wherein the antigen-presenting cells comprise any one or more of the following: dendritic cells, macrophages, or B cells.

A preferred embodiment according to the present disclosure, wherein the therapeutic and/or prophylactic agent and the lipid composition are used in an amount such that the charge ratio of net positive to negative charge in the composition is 1:2 to 1:5.

A preferred embodiment according to the present disclosure, wherein the lipid composition comprises:
(1) 14 mol % to 33 mol % of the permanently anionic lipid;
(2) 40 mol % to 57 mol % of the permanently cationic lipid;
(3) 22 mol % to 40 mol % of the neutral lipid;
the permanently anionic lipid is 2-acetamidoethyl ((R)-2,3-bis(oleoyloxy) propyl) phosphate and/or a salt thereof; the permanently cationic lipid is 1,2-di-O-octadecenyl-3-trimethylammonium propane and/or a salt thereof; the neutral lipid is 1,2-dioleoyl-sn-glycero-3-phosphoethanolamine and/or a salt thereof;
the charge ratio of net positive to negative charge in the composition is 1:2 to 1:5.

A preferred embodiment according to the present disclosure, wherein the charge ratio of net positive to negative charge in the composition is 1:2;
or, the charge ratio of net positive to negative charge in the composition is 2:5;
or, the charge ratio of net positive to negative charge in the composition is 1:3;
or, the charge ratio of net positive to negative charge in the composition is 1:5.

A preferred embodiment according to the present disclosure, wherein the nucleic acid molecule is RNA encoding one or more antigens.

A preferred embodiment according to the present disclosure, wherein the composition further comprises at least one auxiliary ingredient or adjuvant.

A preferred embodiment according to the present disclosure, wherein the composition further comprises one or more pharmaceutically acceptable carriers, diluents, or excipients.

A preferred embodiment according to the present disclosure, wherein the composition further comprises one or more hydrophobic small molecules, permeability-enhancing molecules, carbohydrates, polymers, surface modifiers, functionalized lipids, or cytokines.

A fourth aspect of the present disclosure provides a method for preparing a composition for delivering a therapeutic and/or prophylactic agent to antigen-presenting cells in target organs, wherein the method comprises:
(a) dissolving a permanently anionic lipid, a permanently cationic lipid, and a neutral lipid in an organic solvent to form a lipid solution, wherein the molar ratio of the permanently anionic lipid, permanently cationic lipid, and neutral lipid is (14 to 33):(40 to 57):(22 to 40);
(b) mixing the lipid solution obtained in step (a) with water to obtain a lipid mixture;

(c) mixing the lipid mixture obtained in step (b) with the therapeutic and/or prophylactic agent to form the composition, wherein the therapeutic and/or prophylactic agent comprises a nucleic acid buffer solution obtained by dissolving a nucleic acid molecule in a buffer with a pH of 6.8 to 7.6.

A preferred embodiment according to the present disclosure, wherein in step (a), the organic solvent is an alcohol solvent.

A preferred embodiment according to the present disclosure, wherein in step (b), the lipid mixture is capable of passing through a polycarbonate membrane with a pore size of 100 to 400 nm.

A preferred embodiment according to the present disclosure, wherein in step (c), the buffer comprises an aqueous HEPES buffer.

A preferred embodiment according to the present disclosure, wherein in step (c), the nucleic acid molecule is a nucleic acid molecule capable of encoding one or more antigens.

A preferred embodiment according to the present disclosure, wherein in step (a), the organic solvent comprises an alcohol with 1 to 4 carbon atoms.

A preferred embodiment according to the present disclosure, wherein in step (c), the buffer comprises an aqueous HEPES buffer and EDTA.

A preferred embodiment according to the present disclosure, wherein in step (c), the antigen is a disease-associated antigen, or the nucleic acid molecule or antigen is capable of eliciting an immune response against disease-associated antigens or cells expressing disease-associated antigens.

A preferred embodiment according to the present disclosure, wherein the permanently anionic lipid comprises a phosphate group.

A preferred embodiment according to the present disclosure, wherein the permanently comprises a phosphate group and/or a quaternary ammonium group.

A preferred embodiment according to the present disclosure, wherein the permanently anionic lipid is selected from any one or more of the following:
2-acetamidoethyl ((R)-2,3-bis(oleoyloxy) propyl) phosphate, (Z)—(R)-3-(phosphonooxy) propane-1,2-diyl dioleate, 1,2-dioleoyl-sn-glycero-3-phospho-rac-glycerol, or salts thereof.

A preferred embodiment according to the present disclosure, wherein the permanently cationic lipid is selected from any one or more of the following:
1,2-di-O-octadecenyl-3-trimethylammonium propane, 1,2-dioleoyl-3-trimethylammonium-propane, or salts thereof.

A preferred embodiment according to the present disclosure, wherein the neutral lipid is selected from:
1,2-dioleoyl-sn-glycero-3-phosphoethanolamine, and/or distearoylphosphatidylcholine, or salts thereof.

A preferred embodiment according to the present disclosure, wherein in step (c), the lipid mixture and the therapeutic and/or prophylactic agent are used in an amount such that the charge ratio of net positive to negative charge in the obtained composition is 1:2 to 1:5.

A fifth aspect of the present disclosure provides a use of the lipid composition according to the first aspect, the composition according to the third aspect, or a composition prepared with the method according to the fourth aspect in the manufacture of a medicament capable of inducing an immune response in cells.

A sixth aspect of the present disclosure provides a use of the lipid composition according to the second aspect, the composition according to the third aspect, or a composition prepared with the method according to the fourth aspect in the manufacture of a medicament for the prevention, diagnosis, treatment, or amelioration of diseases, conditions, abnormal disorders, or dysfunctions in a mammalian subject.

A preferred embodiment according to the present disclosure, wherein the disease, condition, abnormal disorder, or dysfunction is selected from any one or more of the following: infectious diseases, cancer, proliferative diseases, genetic diseases, autoimmune diseases, neurodegenerative diseases, cardiovascular and renal vascular diseases, or metabolic diseases.

A preferred embodiment according to the present disclosure, wherein the mammalian subject is selected from one or more of humans, non-human primates, companion animals, exotic species, livestock animals, or animals raised for food.

According to some preferred embodiments of the present disclosure, a composition with suitable particle size distribution characteristics may be formed, which meets the requirements for intravenous administration to patients. It may be formed by incubating the lipid composition with RNA through self-assembly. Thus, the composition of the present disclosure meets the critical requirements for pharmaceutical preparations in terms of particle size distribution characteristics and stability, making it suitable for administration to patients.

The composition prepared in the present disclosure by adding a permanently anionic lipid has at least the following advantages: 1) good particle size with uniform particle distribution; 2) significantly increased protein expression level of the antigen in the spleen; and 3) significantly increased percentage of cells that express the antigen among antigen-presenting cells (e.g., B cells, pDC cells, cDC cells, and macrophages) in the spleen. Specifically: I. By adding a permanently anionic lipid containing phosphate groups, a composition with good particle size (particle size controlled between 240 and 500 nm) and uniform particle distribution (PDI<0.5) may be obtained.

1. By adding permanently anionic lipids, particularly those containing phosphate groups, including ADOPE, 18PA, DOPG, tetradecylphosphonic acid, farnesyl pyrophosphate, $\gamma,\gamma$-dimethylallyl pyrophosphate, and pA (2'-OMe) mpG, the prepared compositions exhibit good particle size and PDI. Among them, ADOPE is the most preferred, with a particle size of 303.1 nm and a PDI as low as 0.2455, indicating good particle uniformity.

2. In contrast, compositions using other types of anionic lipids that do not contain phosphate groups, such as oleic acid, sodium dilaureth-7 citrate, and sodium lauryl sulfonate, result in larger particle sizes exceeding 1000 nm and exhibit solid precipitation, making them unsuitable as mRNA delivery vectors.

II. The composition designed in the present disclosure, which comprises a permanently anionic lipid, a permanently cationic lipid, and a neutral lipid, particularly with a molar percentage ratio of (14 mol % to 33 mol %):(40 mol % to 57 mol %):(22 mol % to 40 mol %), and/or a charge ratio of 1:2 to 1:5, can significantly enhance the protein expression level (corresponding to the total radiation intensity) of the antigen in the spleen.

1. In vivo imaging experiments in mice show that the protein expression level of the antigen, delivered by the composition containing a permanently anionic lipid designed in the present disclosure, is significantly higher in the spleen than other organs (e.g., liver, lung). The total radiation intensity of the protein expressed from FlucmRNA delivered by the prepared composition in the spleen reaches as high as $1.20 \times 10^7$ to $7.38 \times 10^7$ p/s.

2. Compared with compositions prepared without the addition of anionic lipids, the protein expression level of the antigen in the spleen, delivered by the composition designed in the present disclosure, is significantly higher than that of the compositions prepared without the addition of anionic lipids.

For example, the total radiation intensity of the protein expressed from Fluc-mRNA delivered by the mRNA composition designed in the present disclosure in the spleen is as high as 12.1 times that of the composition without anionic lipids.

3. The protein expression level of the antigen in the spleen, delivered by the composition designed in the present disclosure, is significantly higher than that of prior art LNPs.

For example, the total radiation intensity of the protein expressed in the spleen by the composition designed in the present disclosure is 9.46 times that of the prior art YK-009-mRNA-LNP and 7.1 times that of YK-407-mRNA-LNP.

III. The composition designed in the present disclosure significantly increases the percentage of cells that express the antigen among antigen-presenting cells (e.g., B cells, pDC cells, cDC cells, macrophages) in the spleen.

1. Flow cytometry experiments on mouse spleen cells show that the composition comprising a permanently anionic lipid, as designed in the present disclosure, significantly increases the percentage of cells that express the antigen among antigen-presenting cells (e.g., B cells, pDC cells, cDC cells, macrophages) in the spleen.

For example, the percentage of B cells among antigen-presenting cells is about 0.1 to 0.4%, the percentage of pDC cells is about 2 to 6%, the percentage of cDC cells is about 2 to 9%, and the percentage of macrophages is about 2.4 to 7.5%.

2. Compared with the composition without anionic lipids, the composition designed in the present disclosure significantly increases the percentage of cells that express the antigen among antigen-presenting cells in the spleen.

For example, after administration of the composition provided by the present disclosure, the percentage of eGFP-expressing B cells, pDC cells, cDC cells, and macrophages is 19 times, 2.8 times, 8.1 times, and 11.8 times, respectively, that of the composition without anionic lipids.

3. The composition with the specific combination designed in the present disclosure results in a significantly higher percentage of cells that express the antigen among antigen-presenting cells in the spleen compared to other combinations of compositions.

For example, after administering the composition with the specific combination (permanently anionic lipid ADOPE, permanently cationic lipid DOTMA, neutral lipid DOPE) designed in the present disclosure, the percentage of eGFP-expressing B cells, pDC cells, cDC cells, and macrophages is 4.8 times, 5.6 times, 12.1 times, and 11.6 times, respectively, that of the eGFP RNA composition with pA (2'-OMe) mpG (permanently anionic lipid pA (2'-OMe) mpG, permanently cationic lipid DOTMA, neutral lipid DOPE).

IV. Compared with LPX-RNA compositions without anionic lipids, the composition with the specific combination designed in the present disclosure significantly enhances the ability to stimulate IFN-α cytokine, which proves that the composition of the present disclosure may initiate a robust type I IFN-driven immune stimulation program.

For example, at 6 hours and 24 hours post-injection, the IFN-α cytokine contents in the serum administered the composition comprising permanently anionic lipids of the present disclosure are about 1.7 to 4 times and 1.5 to 5 times, respectively, higher than those administered with the LPX-RNA composition without anionic lipids.

V. Compared with LPX-RNA compositions without anionic lipids, the composition with the specific combination designed in the present disclosure significantly enhances the ability to stimulate antigen-specific cytotoxic T cells, which proves that the composition of the present disclosure may produce a very strong T-cell effect.

For example, on day 13 post-injection, the percentage of OVA antigen-specific $CD8^+$ T cells in the total $CD8^+$ T cells in the serum administered the composition with the specific combination comprising a permanently anionic lipid of the present disclosure is 1.3 to 1.9 times higher than those administered with the LPX-RNA composition without anionic lipids.

VI. Compared with LPX-RNA compositions without anionic lipids, the composition with the specific combination designed in the present disclosure demonstrates a significant effect in controlling tumor growth and prolonging the survival time of tumor-bearing animals in animal experiments.

For example, after subcutaneous inoculation of B16F10-OVA melanoma cells in mice, compared with the blank lipid control group and the control group administered with the LPX-RNA composition without anionic lipids, administration of the composition with the specific combination comprising a permanently anionic lipid designed in the present disclosure effectively delays tumor growth rate, significantly reduces tumor size, and notably increases the survival rate of tumor-bearing mice.

BRIEF DESCRIPTION OF THE DRAWINGS

To more clearly illustrate the technical solutions of the embodiments of the present disclosure, a brief introduction to the accompanying drawings is provided below. It is apparent that the drawings described below relate to some specific embodiments of the present disclosure and are not intended to limit the scope of the present disclosure.

DETAILED DESCRIPTION OF THE PREFERRED EMBODIMENT

Figure 1A:
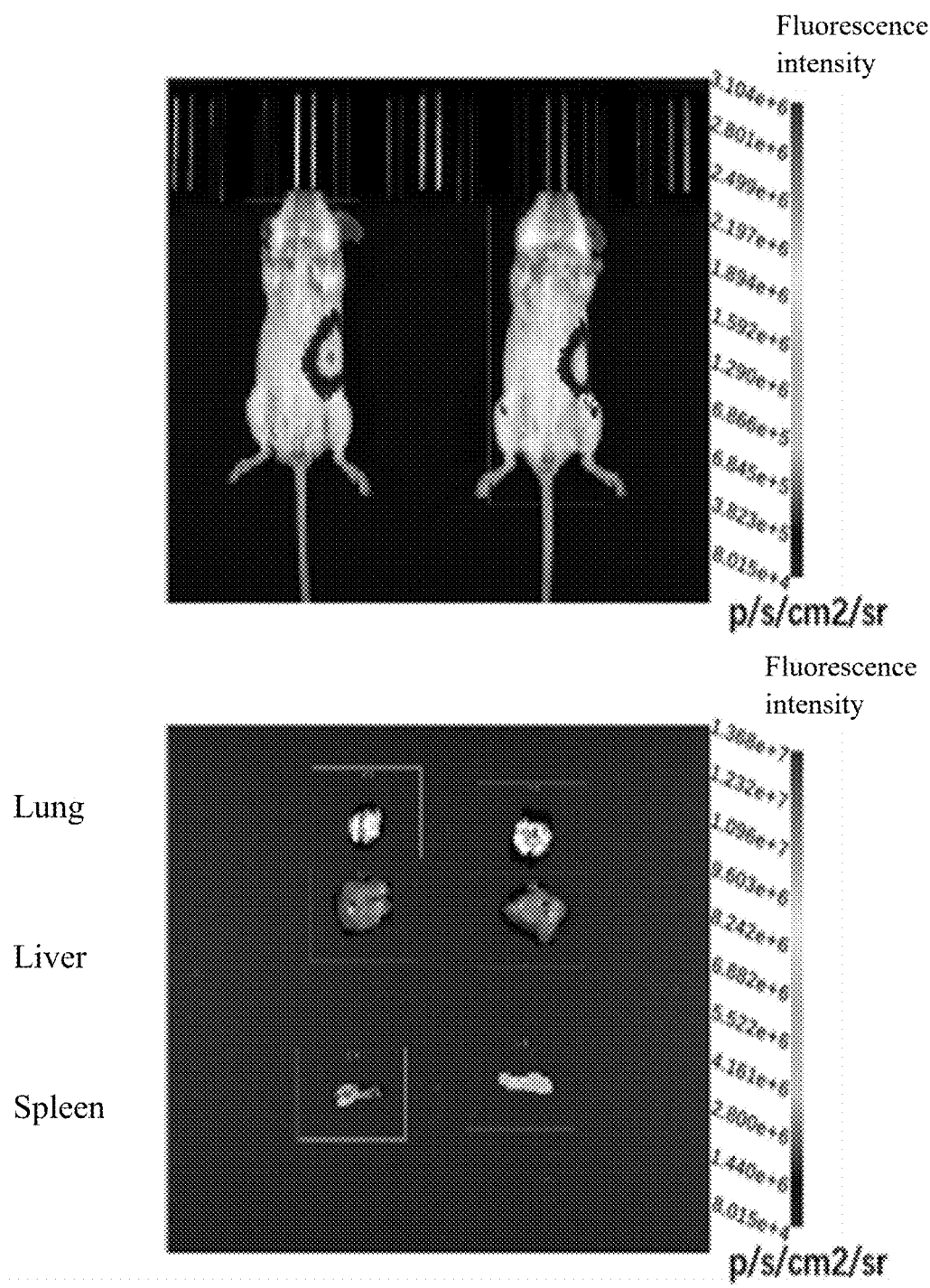
FIG. 1A, FIG. 1B, FIG. 1C, and FIG. 1D show fluorescence images of mice and mouse organs (liver, spleen, lung) corresponding to the compositions comprising Fluc-mRNA, listed as No. 6, 7, 8, and 17 in Table 8.
Figure 1B:
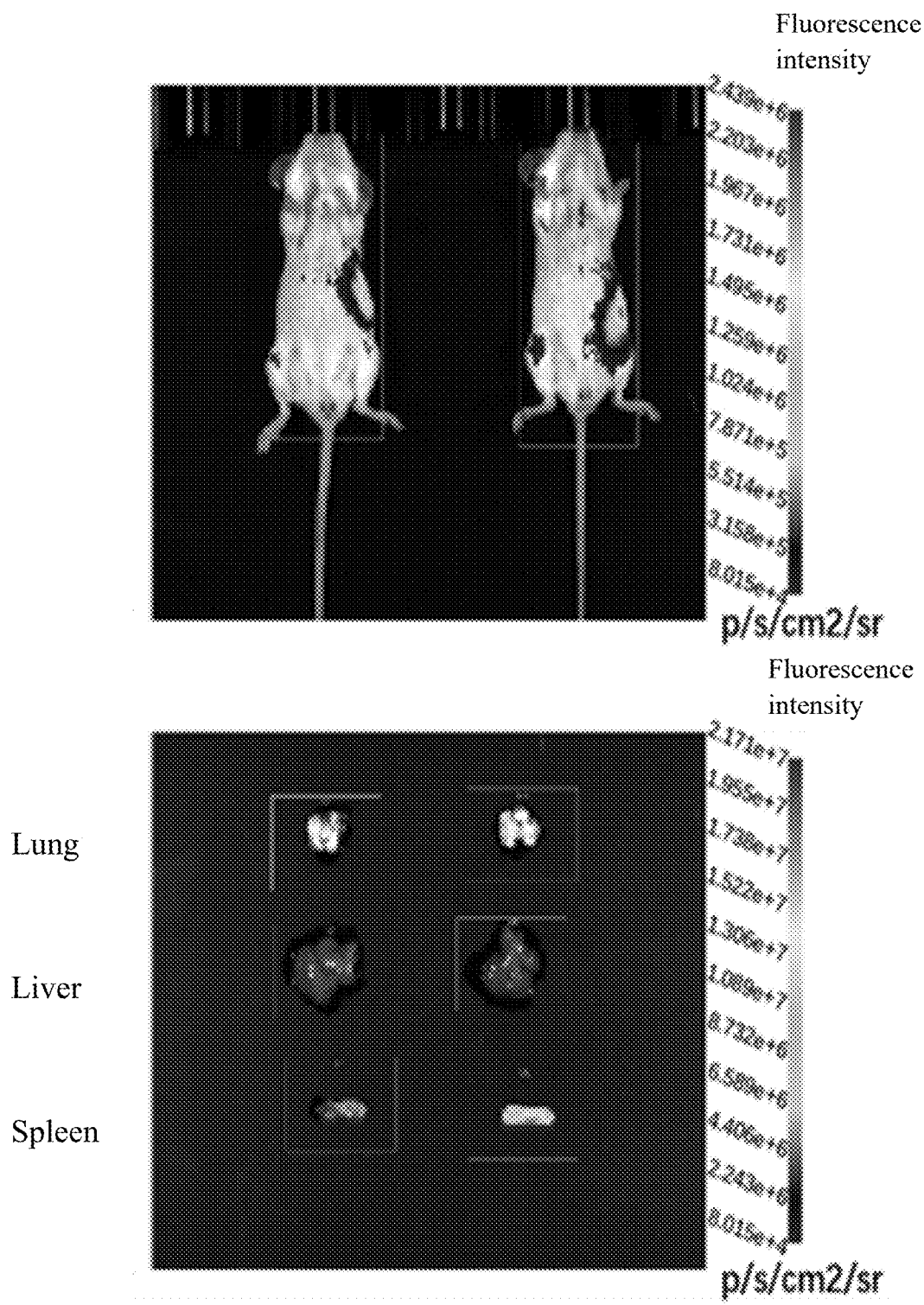
Figure 1C:
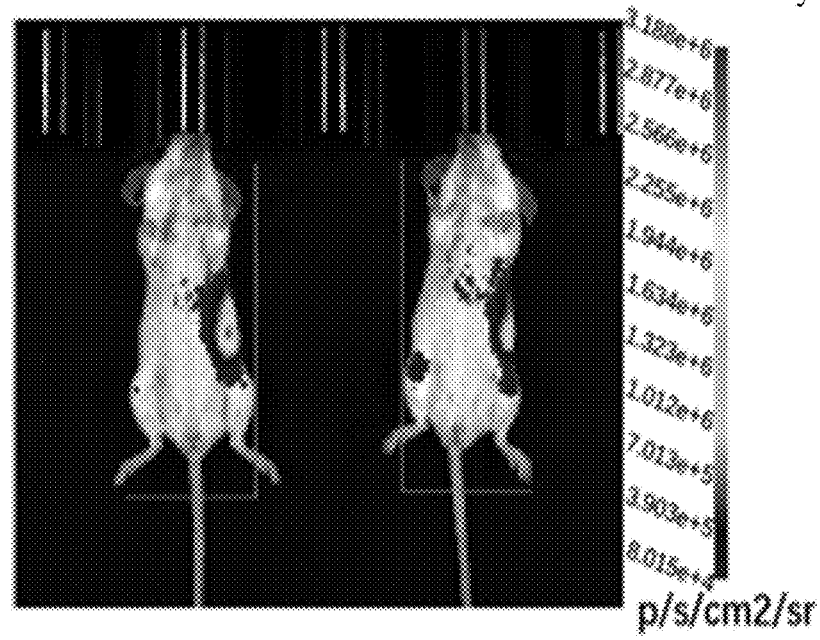
Figure 1C:
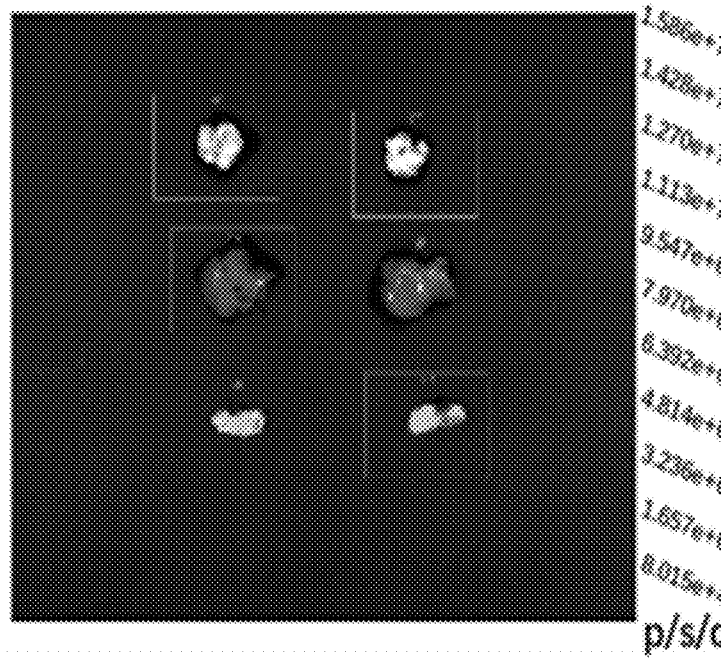
Figure 1D:
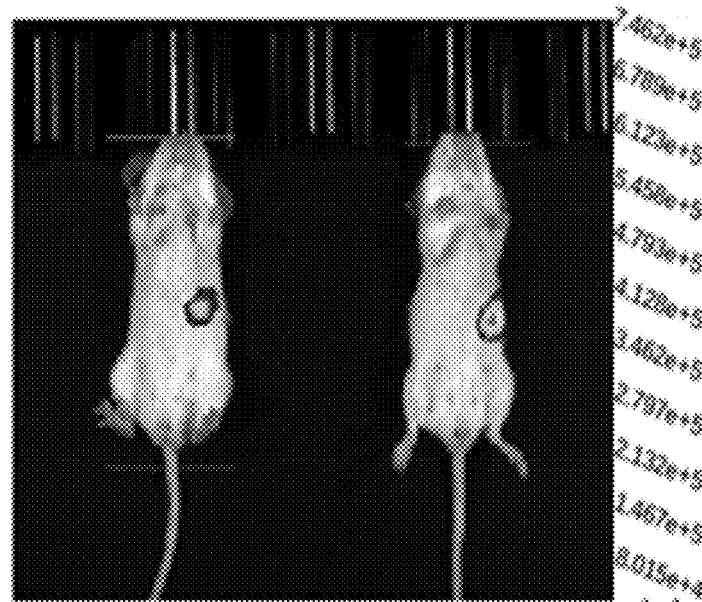
Figure 1D:
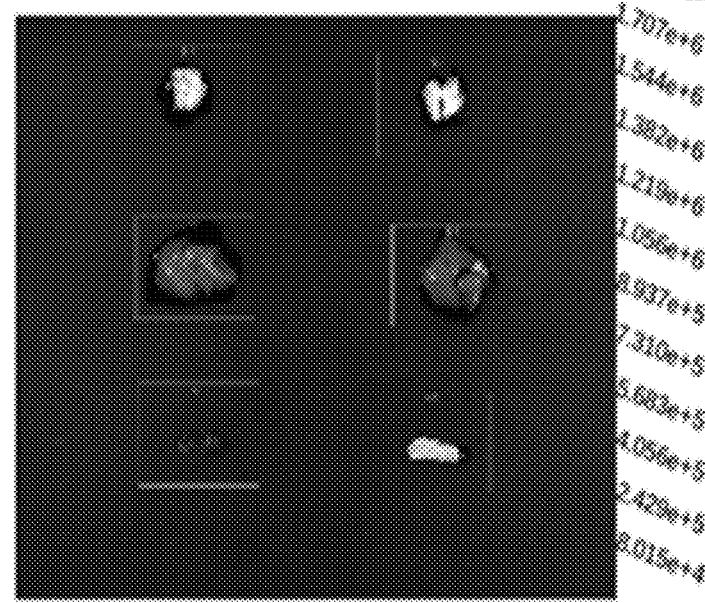

To make the objects, technical solutions, and advantages of the present disclosure clearer, the technical solutions of the present disclosure will be described more clearly and comprehensively in conjunction with the accompanying drawings. Apparently, the specific embodiments described are only some of the embodiments of the present disclosure, not all of them. Based on the described embodiments of the present disclosure, all other embodiments obtained by those of ordinary skill in the art without the need for creative effort shall fall within the scope of protection of the present disclosure.

The present disclosure may be embodied in other specific forms without departing from the essential attributes of the present disclosure. It should be understood that any and all embodiments of the present disclosure may be combined with technical features in any other embodiment or a plurality of other embodiments to obtain additional embodiments under the premise of no conflict. The present disclosure includes additional embodiments obtained from such combinations.

All publications and patents mentioned in the present disclosure are incorporated herein by reference in their entirety. If usage or terminology used in any publications and patents incorporated by reference conflicts with usage or terminology used in the present disclosure, the usage and terminology in the present disclosure shall prevail.

The section headings used in the present disclosure are for the sole purpose of organizing the article and should not be construed as a limitation on the subject matter described.

Unless otherwise specified, all technical and scientific terms used in the present disclosure have their ordinary meanings in the art to which the claimed subject matter pertains. If there are multiple definitions for a term, the definition in the present disclosure shall prevail.

Except in the examples or otherwise indicated, all numbers stating quantitative properties, such as doses, in the specification and claims should be understood as modified in all instances by the term "about". It should also be understood that any numerical range recited in the present disclosure is intended to include all sub-ranges within the range and any combination of the various endpoints of the range or sub-ranges.

The words "comprising", "including", or "containing" and similar words used in the present disclosure mean that the element appearing before the word covers the elements listed after the word and their equivalents, and does not exclude unrecited elements. The term "comprising" or "including (containing)" as used in the present disclosure can be open, semi-closed, and closed. In other words, the term also includes "consisting essentially of" or "consisting of".

The term "pharmaceutically acceptable" in the present disclosure means that a compound or composition is chemically and/or toxicologically compatible with the other ingredients making up the preparation and/or with the human or mammal in which it is used to prevent or treat a disease or condition.

The term "subject" or "patient" as used in the present disclosure includes mammalian subjects. For example, the mammalian subject may be selected from one or more of humans, non-human primates, companion animals, exotic species, livestock animals, or animals raised for food.

The term "treatment", as used in the present disclosure, refers to the administration of one or more pharmaceutical substances to a patient or subject who has a disease or exhibits symptoms of the disease, with the aim of curing, alleviating, mitigating, improving, or affecting the disease or the symptoms of the disease. In the context of the present disclosure, unless specifically stated to the contrary, the term "treatment" may also include prevention.

In the present disclosure, the term "antigen" includes any molecule containing at least one epitope capable of eliciting an immune response and/or an epitope against which an immune response is directed, preferably a peptide or protein. Preferably, in the context of the present disclosure, the antigen is such a molecule that, optionally after processing, induces an immune response, preferably specific to the antigen or to the cells that express the antigen. Specifically, "antigen" refers to a molecule that, optionally after processing, is presented by MHC molecules and specifically reacts with T lymphocytes (T cells).

Thus, the antigen or a fragment thereof should be capable of being recognized by the T-cell receptor. Preferably, if recognized by the T-cell receptor, the antigen or fragment is capable of inducing clonal expansion of T cells that carry a T-cell receptor that specifically recognizes the antigen or fragment in the presence of appropriate costimulatory signals. In the context of the embodiments of the present disclosure, the antigen or fragment is preferably presented by cells in the context of MHC molecules, preferably by antigen-presenting cells and/or diseased cells, which leads to an immune response against the antigen or the cells that express the antigen.

According to the present disclosure, any suitable antigen is envisaged as a candidate for use in an immune response, wherein the immune response is preferably a cellular immune response.

The antigen is preferably a product corresponding to or derived from a naturally occurring antigen. The naturally occurring antigen may include or be derived from allergens, viruses, bacteria, fungi, parasites, and other infectious agents and pathogens, or the antigen may be a tumor antigen. According to the present disclosure, the antigen may correspond to a naturally occurring product, such as a viral protein or a portion thereof.

The term "pathogen" refers to pathogenic microorganisms and includes viruses, bacteria, fungi, unicellular organisms, and parasites. Examples of pathogenic viruses include, but are not limited to, human immunodeficiency virus (HIV), cytomegalovirus (CMV), herpes simplex virus (HSV), hepatitis A virus (HAV), HBV, HCV, papillomavirus, and human T-lymphotropic virus (HTLV). Unicellular organisms include, but are not limited to, plasmodium, trypanosoma, entamoeba, etc.

The term "disease-associated antigen" refers to all antigens with pathogenic significance and includes "tumor antigens". According to the present disclosure, it is desirable to induce an immune response against disease-associated antigens or cells that express disease-associated antigens and preferably present the disease-associated antigen in the context of MHC molecules. Preferably, the disease-associated antigen is a naturally occurring antigen. In one embodiment, the disease-associated antigen is expressed in diseased cells and is preferably presented by the MHC molecules of the cells.

The antigen encoded by the RNA (i.e., the therapeutic and/or prophylactic agent) contained in the nanoparticles (lipid compositions) of the present disclosure should induce an immune response against the disease-associated antigen to be targeted or the cells that express the disease-associated antigen to be targeted. Thus, the antigen encoded by the RNA contained in the nanoparticles of the present disclosure may correspond to or include a disease-associated antigen or one or more immunogenic fragments thereof, such as one or more MHC-binding peptides of the disease-associated antigen. Thus, the antigen encoded by the RNA contained in the nanoparticles of the present disclosure may be a recombinant antigen.

The composition provided by the present disclosure has an average size of 240 nm to 500 nm, with a polydispersity index (PDI)≤0.5, preferably ≤0.2, and more preferably ≤0.1.

Permanently Anionic Lipid

In some aspects, the present disclosure provides one or more lipids having one or more hydrophobic components and a permanently anionic group. One anionic group that can be used in the permanently anionic lipid is a phosphate group. The phosphate group may be deprotonated and exhibit a negative charge at a pH below 8, 9, 10, 11, 12, 13, or 14. The hydrophobic component may be one or more C6-C24 alkyl or alkenyl groups. The compound may have one, two, or three hydrophobic groups.

In some embodiments, the permanently anionic lipid is present in an amount of about 14 to 33 mol % of the total lipid composition (i.e., based on the total amount of the lipid composition, the content of the permanently anionic lipid may be 14 to 33 mol %). The composition may contain about 14 mol %, 20 mol %, 25 mol %, or 33 mol % of permanently anionic lipid, or any range derivable from these values.

According to some preferred embodiments of the present disclosure, the permanently anionic lipid is selected from any one or more of the following:
2-acetamidoethyl ((R)-2,3-bis(oleoyloxy) propyl) phosphate, (Z)—(R)-3-(phosphonooxy) propane-1,2-diyl dioleate, 1,2-dioleoyl-sn-glycero-3-phospho-rac-glycerol, or salts thereof (e.g., sodium salts, chloride salts, etc.).

Permanently Cationic Lipid

In some aspects, the present disclosure provides one or more lipids having one or more hydrophobic components and a permanently cationic group. The permanently cationic lipids may comprise groups that possess a positive charge, regardless of pH. One permanently cationic group that can be used in the permanently cationic lipid is a quaternary ammonium group.

In some embodiments, the permanently cationic lipid is present in an amount of about 40 to 57 mol % of the total lipid composition. The composition may contain approximately 40 mol %, 45 mol %, 50 mol %, or 57 mol % of the permanently cationic lipid, or any range derivable from these values.

Some preferred embodiments according to the present disclosure, wherein the permanently cationic lipid is selected from any one or more of the following:
1,2-di-O-octadecenyl-3-trimethylammonium propane, 1,2-dioleoyl-3-trimethylammonium-propane, and salts thereof (e.g., sodium salts, chloride salts, etc.).

Neutral Lipid

In the present disclosure, the neutral lipid refers to an auxiliary lipid that is uncharged or exists in a zwitterionic form at a selected pH value. The neutral lipid may regulate the fluidity of nanoparticles into a lipid bilayer structure and improve efficiency by promoting lipid phase transition, and may also affect target organ/target cell specificity.

For example, the neutral lipid may include one or more of phosphatidylcholine, phosphatidylethanolamine, sphingomyelin, ceramide, sterol, or derivatives thereof.

The carrier components of a composition containing the cationic lipid may include one or more neutral lipids—phospholipids, such as one or more (poly) unsaturated lipids. The phospholipid can be assembled into one or more lipid bilayers. Generally, the phospholipid may comprise a phospholipid moiety and one or more fatty acid moieties.

The neutral lipid moiety may be selected from the non-limiting group consisting of phosphatidylcholine, phosphatidylethanolamine, phosphatidylglycerol, phosphatidylserine, phosphatidic acid, 2-lysophosphatidylcholine, and sphingomyelin. The fatty acid moiety may be selected from the non-limiting group consisting of lauric acid, myristic acid, myristelaidic acid, palmitic acid, palmitoleic acid, stearic acid, oleic acid, linoleic acid, α-linolenic acid, erucic acid, phytanic acid, arachidic acid, arachidonic acid, eicosapentaenoic acid, behenic acid, docosapentaenoic acid, and docosahexaenoic acid. Also contemplated are non-natural species which include natural species with modifications and substitutions including branching, oxidation, cyclization, and alkynes. For example, the phospholipid can be functionalized with or cross-linked with one or more alkynes (e.g., an alkenyl group in which one or more double bonds are replaced by a triple bond). Under appropriate reaction conditions, alkynyl groups may undergo copper-catalyzed cycloaddition reactions upon exposure to azides. These reactions can be used to functionalize the lipid bilayer of the composition to facilitate membrane penetration or cell recognition, or to couple the composition to useful components such as targeting or imaging moieties (e.g., dyes).

The neutral lipid for use in these compositions may be selected from the non-limiting group consisting of 1,2-dilinoleoyl-sn-glycero-3-phosphocholine (DLPC), 1,2-dimyristoyl-sn-glycero-phosphocholine (DMPC), 1,2-dioleoyl-sn-glycero-3-phosphocholine (DOPC), 1,2-dipalmitoyl-sn-glycero-3-phosphocholine (DPPC), 1,2-distearoyl-sn-glycero-3-phosphocholine (DSPC), 1,2-diundecanoyl-sn-glycero-phosphocholine (DUPC), 1-palmitoyl-2-oleoyl-sn-glycero-3-phosphocholine (POPC), 1,2-di-O-octadecenyl-sn-glycero-3-phosphocholine (18:0 Diether PC), 1-oleoyl-2-cholesterylhemisuccinoyl-sn-glycero-3-phosphocholine (OChemsPC), 1-hexadecyl-sn-glycero-3-phosphocholine (C16 Lyso PC), 1,2-dilinolenoyl-sn-glycero-3-phosphocholine, 1,2-diarachidonoyl-sn-glycero-3-phosphocholine, 1,2-didocosahexaenoyl-sn-glycero-3-phosphocholine, 1,2-dioleoyl-sn-glycero-3-phosphoethanolamine (DOPE), 1,2-diphytanoyl-sn-glycero-3-phosphoethanolamine (ME 16.0 PE), 1,2-distearoyl-sn-glycero-3-phosphoethanolamine, 1,2-dilinoleoyl-sn-glycero-3-phosphoethanolamine, 1,2-dilinolenoyl-sn-glycero-3-phosphoethanolamine, 1,2-1,2-didocosahexaenoyl-sn-glycero-3-diarachidonoyl-sn-glycero-3-phosphoethanolamine, phosphoethanolamine, 1,2-dioleoyl-sn-glycero-3-phospho-rac-(1-glycerol) sodium salt (DOPG), dipalmitoyl phosphatidylglycerol (DPPG), palmitoyl oleoyl phosphatidylethanolamine (POPE), distearoyl-phosphatidyl-ethanolamine (DSPE), dipalmitoyl phosphatidylethanolamine (DPPE), dimyristoyl phosphoethanolamine (DMPE), 1-stearoyl-2-oleoyl-sn-glycero-3-phosphoethanolamine (SOPE), 1-stearoyl-2-oleoyl-phosphatidylcholine (SOPC), sphingomyelin, phosphatidylcholine, phosphatidylethanolamine, phosphatidylserine, phosphatidylinositol, phosphatidic acid, palmitoyl oleoyl phosphatidylcholine, lysophosphatidylcholine, lysophosphatidylethanolamine (LPE), and mixtures thereof.

In some embodiments, the neutral lipid comprises DSPC. In some embodiments, the neutral lipid comprises DOPE. In some embodiments, the neutral lipid comprises both DSPC and DOPE.

In some embodiments, the neutral lipid is present in an amount of about 22 to 40 mol % of the total lipid composition. The composition may contain 22 mol %, 25 mol %, 29 mol %, or 40 mol % of the neutral lipid, or any range derivable from these values.

Therapeutic and/or Prophylactic Agent

The composition of the present disclosure may comprise one or more therapeutic and/or prophylactic agents. The lipid composition of the present disclosure can be used to deliver active ingredients such as therapeutic and/or prophylactic agents. The active ingredients can be encapsulated within the lipid composition or combined with the lipid composition. In one embodiment, the charge ratio of the net positive charge in the lipid composition to the negative charge in the active ingredient (e.g., a therapeutic and/or prophylactic agent) is 1:2 to 1:5 (i.e., the charge ratio of the net positive charge to the negative charge in the composition provided by the present disclosure is 1:2 to 1:5). In some embodiments, the preferred charge ratio is 1:2, 2:5, 1:3, or 1:5.

The therapeutic and/or prophylactic agent comprises, but is not limited to, one or more of nucleic acid molecules, small molecule compounds, polypeptides, or proteins. Nucleic acid molecules are preferred.

For example, the therapeutic and/or prophylactic agent is a vaccine or compound capable of eliciting an immune response. Thus, in some preferred embodiments, the therapeutic and/or prophylactic agent may be a nucleic acid molecule capable of encoding one or more antigens.

The lipid composition of the present disclosure may (as a carrier) deliver the therapeutic and/or prophylactic agent to target cells and/or target organs in a mammal. Therefore, the present disclosure also provides a method for the treatment of diseases or conditions in a mammal in need thereof, wherein the method comprises administering the composition comprising the therapeutic and/or prophylactic agent to the mammal and/or contacting mammalian cells with the composition.

Therapeutic and/or prophylactic agents include biologically active substances and may alternatively be referred to as "active agents", "active ingredients", etc. The therapeutic and/or prophylactic agent may be a substance that, after being delivered to cells or organs, causes the desired changes in the cells, organs, or other body tissues or systems. Such substances may be used to treat one or more diseases, conditions, or disorders. In some embodiments, the therapeutic and/or prophylactic agent is a small molecule drug that can be used to treat specific diseases, conditions, or disorders. Examples of the drug that can be used in the composition include, but are not limited to, anti-proliferative agents (e.g., vincristine, doxorubicin, mitoxantrone, camptothecin, cisplatin, bleomycin, cyclophosphamide, methotrexate, and streptozotocin), antitumor agents (e.g., actinomycin D, vincristine, vinblastine, cytosine arabinoside, anthracycline, alkylating agents, platinum compounds, antimetabolites, and nucleoside analogs such as methotrexate and purine and pyrimidine analogs), anti-infective agents, local anesthetics (e.g., dibucaine and chlorpromazine), β-adrenergic blockers (e.g., propranolol, timolol, and labetalol), antihypertensive agents (e.g., clonidine and hydralazine), antidepressants (e.g., imipramine, amitriptyline, and doxepin), anticonvulsants (e.g., phenytoin), antihistamines (e.g., diphenhydramine, chlorpheniramine, and promethazine), antibiotics/antibacterials (e.g., gentamycin, ciprofloxacin, and cefoxitin), antifungals (e.g., miconazole, terconazole, econazole, isoconazole, butaconazole, clotrimazole, itraconazole, nystatin, naftifine, and amphotericin B), antiparasitic agents, hormones, hormone antagonists, immunomodulators, neurotransmitter antagonists, antiglaucoma agents, vitamins, sedatives, and imaging agents.

In some embodiments, the therapeutic and/or prophylactic agent is a cytotoxin, a radioactive ion, a chemotherapeutic agent, a vaccine, a compound that elicits an immune response, and/or another therapeutic and/or prophylactic agent. The cytotoxin or cytotoxic agent includes any agents harmful to cells. Examples include, but are not limited to, taxol, cytochalasin B, gramicidin D, ethidium bromide, emetine, mitomycin, etoposide, teniposide, vincristine, vinblastine, colchicine, doxorubicin, daunorubicin, dihydroxy anthracenedione, mitoxantrone, mithramycin, actinomycin D, 1-dehydrotestosterone, glucocorticoids, procaine, tetracaine, lidocaine, propranolol, puromycin, maytansinoids such as maytansinol, rachelmycin (CC-1065), and analogs or homologs thereof. Radioactive ions include, but are not limited to, iodine (e.g., iodine-125 or iodine-131), strontium-89, phosphorus, palladium, cesium, iridium, phosphate, cobalt, yttrium-90, samarium-153, and praseodymium. The vaccine includes compounds and preparations capable of providing immunity against one or more conditions related to infectious diseases such as influenza, measles, human papillomavirus (HPV), rabies, meningitis, whooping cough, tetanus, plague, hepatitis, and pulmonary tuberculosis, and may include nucleic acid molecules (e.g., mRNA) encoding antigens and/or epitopes derived from infectious disease sources. The vaccine may further comprise a compound or preparation that guides an immune response against cancer cells, and may comprise nucleic acid molecules (e.g., mRNA) encoding antigens, epitopes, and/or neoepitopes derived from tumor cells. The compound that elicits an immune response may include vaccines, corticosteroids (e.g., dexamethasone), and other species. The another therapeutic and/or prophylactic agent includes, but is not limited to, antimetabolites (e.g., methotrexate, 6-mercaptopurine, 6-thioguanine, cytarabine, and 5-fluorouracil dacarbazine), alkylating agents (e.g., mechlorethamine, thiotepa, chlorambucil, azithromycin (CC-1065), melphalan, carmustine (BSNU), lomustine (CCNU), cyclophosphamide, busulfan, dibromomannitol, streptozotocin, mitomycin C, cis-diammineplatinum (II) dichloride (DDP), and cisplatin), anthracyclines (e.g., daunorubicin (formerly called daunomycin) and doxorubicin), antibiotics (e.g., dactinomycin (formerly called actinomycin), bleomycin, mithramycin, and anthramycin (AMC)), and antimitotic agents (e.g., vincristine, vinblastine, paclitaxel, and maytansinoids).

In other embodiments, the therapeutic and/or prophylactic agent is a protein. Therapeutic proteins that can be used in the nanoparticles of the present disclosure include, but are not limited to, gentamicin, amikacin, insulin, erythropoietin (EPO), granulocyte colony-stimulating factor (G-CSF), granulocyte-macrophage colony-stimulating factor (GM-CSF), factor VIR, luteinizing hormone-releasing hormone (LHRH) analogs, interferons, heparin, hepatitis B surface antigen, typhoid vaccine, and cholera vaccine.

In some embodiments, the therapeutic and/or prophylactic agent may be a polynucleotide or nucleic acid (e.g., ribonucleic acid or deoxyribonucleic acid). The term "polynucleotide" in its broadest sense includes any compound and/or substance that is an oligonucleotide chain or can be incorporated into an oligonucleotide chain. Exemplary polynucleotides used according to the present disclosure include, but are not limited to, one or more of the following: deoxyribonucleic acid (DNA); ribonucleic acid (RNA), including messenger RNA (mRNA) and its hybrids; RNAi-inducing factors; RNAi factors; siRNA; shRNA; miRNA; antisense RNA; ribozymes; catalytic DNA; RNA inducing triple-stranded helix formation; aptamers, and others. In some preferred embodiments, the therapeutic and/or prophylactic agent is RNA. RNA that can be used in the composition and method described in the present disclosure may be selected from, but is not limited to, the group consisting of shortmer, antagomir, antisense RNA, ribozymes, small interfering RNA (siRNA), asymmetric interfering RNA (aiRNA), microRNA (miRNA), dicer-substrate RNA (dsRNA), small hairpin RNA (shRNA), transfer RNA (tRNA), messenger RNA (mRNA), and mixtures thereof. In some embodiments, the RNA is mRNA.

In some embodiments, the therapeutic and/or prophylactic agent is mRNA. The mRNA may encode any polypeptide of interest, including any naturally occurring or non-naturally occurring or otherwise modified polypeptide. The polypeptide encoded by the mRNA can be of any size and may have any secondary structure or activity. In some embodiments, the polypeptide encoded by the mRNA may have therapeutic effects when expressed in a cell.

In other embodiments, the therapeutic and/or prophylactic agent is siRNA. siRNA can selectively reduce the expression of a gene of interest or downregulate its expression. For example, the selection of siRNA can result in gene silencing related to a specific disease, condition, or disorder after administering a composition comprising the siRNA to a subject in need thereof. siRNA may comprise a sequence complementary to the mRNA sequence encoding the gene or protein of interest. In some embodiments, siRNA may be immunomodulatory siRNA.

In some embodiments, the therapeutic and/or prophylactic agent is sgRNA and/or cas9 mRNA. sgRNA and/or cas9 mRNA can be used as gene-editing tools. For example, the sgRNA-cas9 complex can affect the mRNA translation of a gene in the cell.

In some embodiments, the therapeutic and/or prophylactic agent is shRNA or its encoding vector or plasmid. shRNA can be produced inside target cells after the appropriate construct is delivered into the nucleus. The constructs and mechanisms related to shRNA are well known in the relevant field.

Disease or Condition

The composition/carrier of the present disclosure can deliver a therapeutic and/or prophylactic agent to a subject or patient. The therapeutic and/or prophylactic agent comprises, but are not limited to, one or more of nucleic acid molecules, small molecule compounds, polypeptides, or proteins. Therefore, the composition of the present disclosure can be used for the preparation of nucleic acid drugs, gene vaccines, small molecule drugs, polypeptide or protein drugs. Due to the variety of the therapeutic and/or prophylactic agents described above, the composition of the present disclosure can be used to treat or prevent a variety of diseases or conditions.

In one embodiment, the disease or condition is characterized by dysfunctional or abnormal protein or polypeptide activity.

The agents, compositions, and methods described in the present disclosure can be used to treat subjects suffering from diseases (e.g., diseases characterized by the presence of diseased cells expressing antigens and presenting antigenic peptides). Examples of diseases that can be treated and/or prevented include all diseases expressing one of the antigens described in the present disclosure. Particularly preferred diseases are infectious diseases (e.g., viral diseases) and cancer. The agents, compositions, and methods described in the present disclosure can further be used for immunization or vaccination to prevent the diseases described in the present disclosure.

According to the present disclosure, the term "disease" refers to any pathological condition, including infectious diseases and cancer, especially the forms of infectious diseases and diseases described in the present disclosure.

The disease to be treated in the present disclosure is preferably a disease involving an antigen. According to the present disclosure, the term "disease involving an antigen" or similar expressions mean that the antigen is expressed in cells of diseased tissues or organs. The expression in cells of diseased tissues or organs may be elevated compared to the state of healthy tissues or organs. In one embodiment, the expression occurs only in diseased tissues, while expression in healthy tissues is suppressed. According to the present disclosure, the disease involving an antigen includes infectious diseases and cancer, wherein the disease-associated antigen is preferably an antigen from infectious agents and a tumor antigen, respectively. Preferably, the disease involving an antigen is a disease involving cells that express the antigen and present the antigen in the context of MHC molecules (particularly class I MHC).

For example, the disease or condition is selected from the group consisting of infectious diseases, cancer and proliferative diseases, genetic diseases, autoimmune diseases, diabetes, neurodegenerative diseases, cardiovascular and renal vascular diseases, and metabolic diseases.

Examples of infectious diseases include: 1) viral infectious diseases, such as AIDS (HIV), hepatitis A, hepatitis B, hepatitis C, herpes zoster (chickenpox), rubella (rubella virus), yellow fever, dengue, flaviviruses, coronaviruses, influenza virus, rabies virus, and hemorrhagic infectious diseases (Marburg virus or Ebola virus); 2) bacterial infectious diseases, such as Legionnaire's disease (*Legionella*), stomach ulcers (*Helicobacter*), cholera (*Vibrio*), and infections caused by *Escherichia coli*, Staphylococci, *Salmonella*, or Streptococci (tetanus); 3) infections caused by protozoan pathogens, such as malaria, sleeping sickness, leishmaniasis, and toxoplasmosis, that are caused by Plasmodium, Trypanosoma, Leishmania, and Toxoplasma, respectively; or 4) fungal infections, caused, for example, by *Cryptococcus neoformans, Histoplasma capsulatum, Coccidioides immitis, Blastomyces dermatitidis*, or *Candida albicans*.

The cancer or carcinoma (medically termed as malignant tumor) is a type of disease in which a group of cells exhibit uncontrolled growth (dividing beyond normal limits), invasion (invading and destroying adjacent tissues), and sometimes metastasis (spreading to other parts of the body through lymph or blood). These three harmful characteristics of cancer distinguish it from benign tumors, which are self-limiting and do not invade or metastasize. Most cancers develop tumors, which are swellings or lesions caused by abnormal cell growth (referred to as neoplastic cells or tumor cells), although some cancers, like leukemia, do not develop tumors. According to the present disclosure, the term "cancer" includes leukemia, seminoma, melanoma, teratoma, lymphoma, sarcoma, blastoma, neuroblastoma, glioma, glioblastoma, kidney cancer, adrenal cancer, renal cell carcinoma, thyroid cancer, blood cancer, skin cancer, brain cancer, cervical cancer, intestinal cancer, liver cancer, colon cancer, stomach cancer, lung cancer, intestinal cancer, head and neck cancer, gastrointestinal cancer, multiple myeloma, lymph node cancer, esophageal cancer, rectal cancer, bladder cancer, prostate cancer, endometrial cancer, pancreatic cancer, ear, nose, and throat (ENT) cancer, breast cancer, uterine cancer, breast carcinoma, ovarian cancer, and metastases thereof.

Malignant melanoma is a severe type of skin cancer. It results from the uncontrolled growth of pigment cells known as melanocytes.

According to the present disclosure, "epithelioma" refers to a malignant tumor derived from epithelial cells. This group comprises the most common types of cancers, including the common forms of breast cancer, prostate cancer, lung cancer, and colon cancer.

Lymphomas and leukemias are malignant tumors derived from hematopoietic (blood-forming) cells.

A sarcoma is a cancer originating from transformed cells of one of some tissues that develop from the mesoderm in an embryo. Thus, sarcomas include bone tumors, cartilage tumors, fat tumors, muscle tumors, vascular tumors, and hematopoietic tissue tumors.

A blastic tumor or blastoma is a tumor (usually malignant) that resembles immature or embryonic tissue. Most of these tumors are commonly found in children.

A glioma is a type of tumor that begins in the brain or spinal cord. It is referred to as a glioma because it originates from glial cells. The most common location for gliomas is the brain.

Other Component or Adjuvant

The composition of the present disclosure may be administered with supplementary immune-enhancing substances (e.g., one or more adjuvants) and may comprise one or more immune-enhancing substances to further increase its effectiveness, preferably to achieve a synergistic effect of immune stimulation. The term "adjuvant" refers to a compound that prolongs, enhances, or accelerates the immune response. Various mechanisms may be involved, depending on the type of various adjuvants. For example, compounds that mature DC (e.g., lipopolysaccharide or CD40 ligand) constitute the first class of suitable adjuvants. Generally, any agent (LPS, GP96, dsRNA, etc.) or cytokine (e.g., GM-CSF) that affects the immune system of the "danger signal" type can be used as an adjuvant capable of enhancing and/or affecting the immune response in a controlled manner. CpG oligodeoxynucleotides may also optionally be used in this context, although, as explained above, they are considered to have side effects in certain situations. Particularly preferred adjuvants are cytokines, such as monokines, lymphokines, interleukins, or chemokines, such as IL-1, IL-2, IL-3, IL-4, IL-5, IL-6, IL-7, IL-8, IL-9, IL-10, IL-12, INF-α, INF-γ, GM-CSF, LT-α, or growth factors such as hGH. Additionally, other known adjuvants are aluminum hydroxide, Freund's adjuvant, or oils. For example, Montanide®; preferably Montanide® ISA51, lipopeptides (e.g., Pam3Cys, Pam3CSK4), glucopyranosyl lipid adjuvant (GLA), CpG oligodeoxynucleotides (e.g., class A or class B), and poly (I:C) are also suitable for use as adjuvants in the composition of the present disclosure.

The composition may comprise one or more components in addition to those described in the previous sections. For example, the composition may include one or more hydrophobic small molecules, such as vitamins (e.g., vitamin A or vitamin E) or sterols.

The composition may further comprise one or more permeability-enhancing molecules, carbohydrates, polymers, surface-modifying agents, or other components. Permeability-enhancing molecules may be, for example, those described in U.S. Patent Application Publication No. 2005/0222064. Carbohydrates may include simple sugars (e.g., glucose) and polysaccharides (e.g., glycogen and its derivatives and analogs).

Surface-modifying agents may include, but are not limited to, anionic proteins (e.g., bovine serum albumin), surfactants (e.g., cationic surfactants such as dimethyldioctadecyl ammonium bromide), sugars or sugar derivatives (e.g., cyclodextrins), nucleic acids, polymers (e.g., heparin, polyethylene glycol, and poloxamer), mucolytics (e.g., acetylcysteine, artemisia argyi, bromelain, papain, clerodendrum, bromhexine, carbocisteine, eprazinone, mesna, ambroxol, sobrerol, domiodol, letosteine, stepronin, tiopronin, gelsolin, thymosin β4, dornase alfa, neltenexine, and erdosteine), and DNases (e.g., rhDNase). Surface-modifying agents may be placed inside and/or on the surface of the nanoparticles in the composition (e.g., through coating, adsorption, covalent linkage, or other methods).

The composition may further comprise one or more functionalized lipids. For example, lipids may be functionalized with alkynyl groups, which, under appropriate reaction conditions, may undergo cycloaddition reactions when exposed to azides. To be precise, the lipid bilayer can be functionalized in this manner with one or more groups that effectively promote membrane permeability, cell recognition, or imaging. The surface of the composition may also be conjugated with one or more useful antibodies. Functional groups and conjugates that can be used for targeted cell delivery, imaging, and membrane permeability are well known in the art.

In addition to these components, the composition may comprise any substances that can used in a pharmaceutical composition. For example, the composition may comprise one or more pharmaceutically acceptable (i.e., suitable for medical use) excipients or auxiliary components, such as, but not limited to, one or more solvents, dispersion media, diluents, dispersing aids, suspending aids, granulating aids, disintegrants, fillers, glidants, liquid vehicles, binders, surfactants, isotonic agents, thickeners or emulsifiers, buffers, lubricants, oils, preservatives, flavoring agents, coloring agents, and others.

The term "pharmaceutically acceptable" refers to the nontoxicity of the material, which does not affect the action of the active ingredients of the pharmaceutical composition. Non-pharmaceutically acceptable ingredients may be used to prepare pharmaceutically acceptable ingredients and are included in the present disclosure.

Appropriate buffers for use in the composition of the present disclosure include a salt of acetic acid, salt of citric acid, salt of boric acid, and salt of phosphoric acid.

When used in the present disclosure, the term "excipient" is intended to refer to all substances that may be present in the pharmaceutical composition of the present disclosure but are not active ingredients, such as carriers, binders, lubricants, thickeners, surfactants, preservatives, emulsifiers, buffers, flavoring agents, or coloring agents. The excipients are, for example, starch, lactose, or dextrin. The pharmaceutically acceptable excipients are well known in the art (see, for example, Remington's The Science and Practice of Pharmacy, 21st Edition, A. R. Gennaro; Lippincott, Williams & Wilkins, Baltimore, MD, 2006).

The term "carrier" refers to an organic or inorganic component of natural or synthetic nature that, is used in conjunction with the active ingredient to facilitate, enhance, or enable administration. According to the present disclosure, the term "carrier" also includes one or more compatible solid or liquid fillers, diluents, or encapsulating materials suitable for administration to a patient.

Carrier substances suitable for parenteral administration are, for example, sterile water, Ringer's solution, lactated Ringer's solution, sterile sodium chloride solution, polyalkylene glycol, hydrogenated naphthalenes, and particularly biocompatible lactide polymers, lactide/glycolide copolymers, or polyethylene oxide/polypropylene oxide copolymers.

Appropriate preservatives for use in the composition of the present disclosure include benzalkonium chloride, chlorobutanol, parabens, and thiomersal.

Examples of diluents may include, but are not limited to, calcium carbonate, sodium carbonate, calcium phosphate, dicalcium phosphate, calcium sulfate, calcium hydrogen phosphate, sodium phosphate, lactose, sucrose, cellulose, microcrystalline cellulose, kaolin, mannitol, sorbitol, inositol, sodium chloride, dried starch, corn starch, powdered sugar, and/or combinations thereof.

Dosage Form and Administration

The composition of the present disclosure may be prepared in the form of solid, semi-solid, liquid, or gaseous preparations, for example, tablets, capsules, ointments, elixirs, syrups, solutions, emulsions, suspensions, injections, or aerosols. The composition of the present disclosure can be prepared with methods well known in the pharmaceutical field. For example, sterile injectable solutions can be prepared by incorporating the required amount of the therapeutic or prophylactic agent with various other components into a suitable solvent, such as sterile distilled water, followed by sterilization via filtration. Surfactants may also be added to facilitate the formation of a uniform solution or suspension.

For example, the composition of the present disclosure may be administered intravenously, intramuscularly, intradermally, subcutaneously, intranasally, or by inhalation. In one embodiment, the composition is administered intravenously or subcutaneously.

Therapeutically Effective Amount

A "therapeutically effective amount" is the amount of a therapeutic agent that, when administered to a patient, can improve the disease or symptoms. A "preventatively effective amount" is the amount of a prophylactic agent that, when administered to a subject, can prevent the disease or symptoms. The amount constituting a "therapeutically effective amount" of a therapeutic agent or a "preventatively effective amount" of a prophylactic agent varies depending on the therapeutic and/or prophylactic agent, the disease state and its severity, and factors such as the age and weight of the patient to be treated and/or subject to be prevented. Those skilled in the art can routinely determine the therapeutically effective amount and preventatively effective amount based on their knowledge and the present disclosure.

The composition is administered in a therapeutically effective amount, and the amount may vary depending on the specific agent selected, the route of administration, the nature of the disease being treated, and the age and condition of the patient, and may ultimately be determined by the attending physician or clinician. For example, the therapeutic or prophylactic agent may be administered to a mammal (e.g., a human) in a dose of about 0.0001 mg/kg to about 10 mg/kg.

Antigen-Presenting Cell

Antigen-presenting cells (APCs) are cells that present (i.e., display) antigens on their surface in the context of a major histocompatibility complex (MHC). This includes cases where only one or more fragments of the antigen are presented. T cells can recognize this complex using their T-cell receptors (TCRs). Antigen-presenting cells process antigens and present them to T cells.

Professional antigen-presenting cells are highly efficient at internalizing antibodies (either through phagocytosis or receptor-mediated endocytosis) and then displaying antigen fragments bound to MHC class II molecules on their membranes. T cells recognize the antigen-MHC class II complex on the membrane of antigen-presenting cells and interact with it. Antigen-presenting cells then produce additional co-stimulatory signals, leading to T-cell activation. The expression of co-stimulatory molecules is a typical feature of professional antigen-presenting cells.

The main types of professional antigen-presenting cells are dendritic cells (which have the broadest range of antigen presentation and are likely the most important antigen-presenting cells), macrophages, B cells, and certain activated epithelial cells.

Dendritic cells are a group of leukocytes, including plasmacytoid dendritic cells (pDC cells) and classical dendritic cells (cDC cells), which present antigens captured in peripheral tissues to T cells through both MHC class II and MHC class I antigen presentation pathways. Dendritic cells are powerful inducers of immune responses, and the activation of these cells is a key step in inducing antitumor immunity.

Antigen-presenting cells can be loaded with MHC-presented peptides by transducing the cells with nucleic acids encoding peptides or proteins including the peptide to be presented (e.g., nucleic acids encoding antigens, such as RNA). Transfecting dendritic cells with mRNA is a promising antigen-loading technique for stimulating a strong antitumor immune response.

The term "immunogenicity" refers to the relative efficiency with which an antigen induces an immune response.

The terms "T cells" and "T lymphocytes" are used interchangeably in the present disclosure and include T helper cells ($CD4^+$ T cells) and cytotoxic T lymphocytes (CTL, $CD8^+$ T cells).

T cells belong to a group of white blood cells known as lymphocytes and play a central role in cell-mediated immunity. They can be distinguished from other types of lymphocytes (e.g., B cells and natural killer cells) by the presence of a specialized receptor on their cell surface called the T-cell receptor (TCR). The thymus is the primary organ responsible for T-cell maturation. Several different T-cell subsets have been identified, each with different functions.

T helper cells assist other white blood cells during the immune process, including helping B cells mature into plasma cells and activating cytotoxic T lymphocytes and macrophages. Because they express the CD4 protein on their surface, these cells are also known as $CD4^+$ T cells. T helper cells are activated when MHC class II molecules, expressed on the surface of antigen-presenting cells (APCs), present peptide antigens to T helper cells. Once activated, they rapidly divide and secrete small proteins called cytokines, which regulate or assist in the active immune response.

Cytotoxic T lymphocytes destroy diseased cells, such as infected cells (e.g., virus-infected cells) and cancer cells, and are also involved in transplant rejection. Because they express CD8 glycoproteins on their surface, these cells are also known as $CD8^+$ T cells. These cells recognize their targets by binding to antigens associated with MHC class I, and the MHC class I is present on the surface of almost every cell in the body.

Most T cells possess a T-cell receptor (TCR) that exists as a complex of several proteins. The actual T-cell receptor is composed of two independent peptide chains, which are produced by the independent T-cell receptor α and β (TCRα and TCRβ) genes and are referred to as the α-TCR chain and β-TCR chain. γδ T cells represent a small subtype of T cells that have a unique T-cell receptor (TCR) on their surface. However, in γδ T cells, the TCR is composed of one γ chain and one δ chain. This group of T cells is less common than αβ T cells (about 2% of total T cells).

All T cells are derived from hematopoietic stem cells in the bone marrow. Hematopoietic progenitor cells derived from hematopoietic stem cells are present in the thymus, and proliferate through cell division to produce large numbers of immature thymocytes. Early thymocytes do not express CD4 and CD8 and are thus classified as double-negative (CD4⁻CD8⁻) cells. As they progress through development, they become double-positive thymocytes (CD4⁺CD8⁺) and eventually mature into single-positive thymocytes (CD4⁺CD8⁻ or CD4⁻CD8⁺), then are released from the thymus into peripheral tissues.

The first signal for T cell activation is provided by the binding of the T cell receptor to a short peptide presented by the major histocompatibility complex (MHC) on another cell. This ensures that only T cells with a TCR specific to that peptide are activated. A partner cell is usually a professional antigen-presenting cell (APC), typically a dendritic cell during the primary response, but B cells and macrophages can also serve as important APCs. Peptides presented by MHC class I molecules to CD8⁺ T cells are 8 to 10 amino acids in length, while peptides presented by MHC class II molecules to CD4⁺ T cells are longer because the binding cleft of MHC class II molecules is open at the ends.

EXAMPLES

The present disclosure is further described below in conjunction with examples. However, the present disclosure is not limited to the following examples. The implementation conditions adopted in the examples may be further adjusted based on different requirements of specific use, and any conditions not specifically indicated are conventional conditions in the art. In the specific examples of the present disclosure, all raw materials used are commercially available. Unless otherwise indicated, percentages in the context refer to weight percentages, and all temperatures are given in degrees Celsius. The technical features involved in the various embodiments of the present disclosure may be combined with each other as long as there is no conflict.

The following abbreviations represent the following reagents:

ADOPE: 2-acetamidoethyl ((R)-2,3-bis(oleoyloxy) propyl) phosphate sodium salt;
DOTMA: 1,2-di-O-octadecenyl-3-trimethylammonium propane (chloride salt);
DOPE: 1,2-dioleoyl-sn-glycero-3-phosphoethanolamine;
18PA: (Z)—(R)-3-(phosphonooxy) propane-1,2-diyl dioleate monosodium salt;
DOPG: 1,2-dioleoyl-sn-glycero-3-phospho-rac-glycerol sodium salt;
pA (2'-OMe) mpG: ((2R,3S,4S,5R)-3-(((((2R,3R,4S,5R)-5-(2-amino-6-oxo-1,6-dihydro-9H-purin-9-yl)-3,4-dihydroxytetrahydrofuran-2-yl) methoxy) (hydroxy) phosphoryl)oxy)-5-(6-amino-9H-purin-9-yl)-4-methoxytetrahydrofuran-2-yl) methyl dihydrogen phosphate;
DSPC: distearoylphosphatidylcholine;
DOTAP: 1,2-dioleoyl-3-trimethylammonium-propane chloride;
HOBt: 1-hydroxybenzotriazole;
EDCI: 1-ethyl-(3-dimethylaminopropyl) carbodiimide hydrochloride.

Example 1: Synthesis of ADOPE

The synthetic route for 2-acetamidoethyl ((R)-2,3-bis (oleoyloxy) propyl) phosphate sodium salt (ADOPE) is as follows:

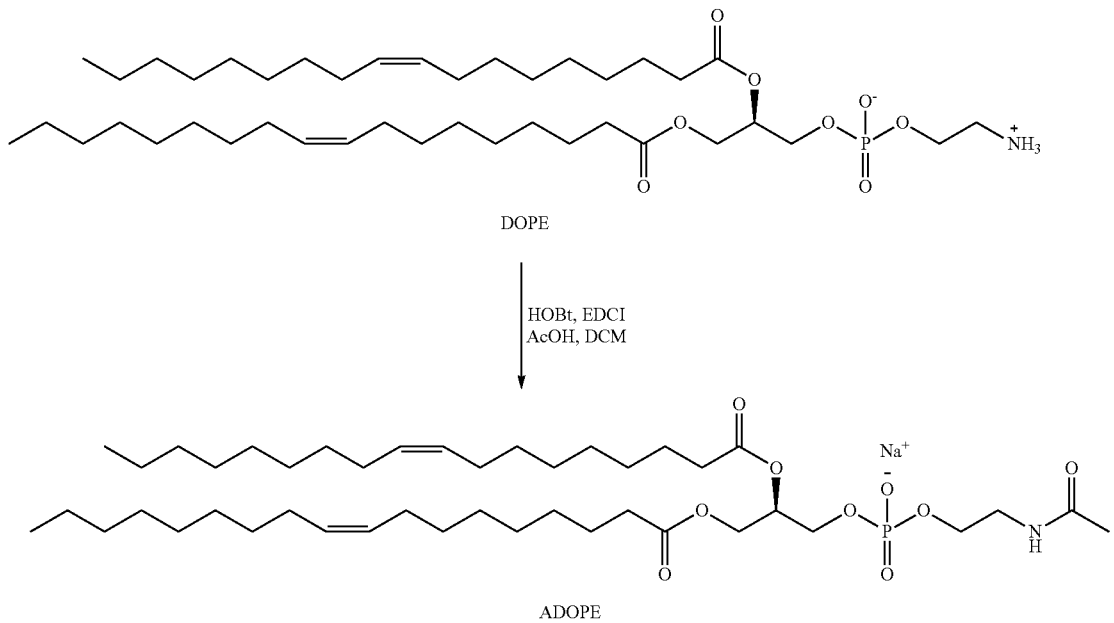

1,2-Dioleoyl-sn-glycero-3-phosphoethanolamine (1.0 g, 1.34 mmol) was dissolved in dichloromethane (3 mL), and then HOBt (910 mg, 6.71 mmol) and EDCI (1.28 g, 6.71 mmol) were sequentially added to the solution. The mixture was stirred and reacted at room temperature for 20 minutes, after which acetic acid (403 mg, 6.71 mmol) was added to the above mixture. The reaction mixture was stirred and reacted at room temperature overnight. After the reaction was completed, the solvent was removed by rotary evaporation, and the residue was purified by silica gel chromatography (eluent: dichloromethane/20% methanol (0.1% trifluoroacetic acid)). The fractions containing the product were rotary evaporated to dryness, dissolved in ethyl acetate, and stirred with a saturated NaHCO$_3$ aqueous solution for 5 minutes. The phases were separated, and the organic phase was dried over anhydrous sodium sulfate, followed by rotary evaporation to dryness. A pale yellow oily compound (1.03 g) was obtained with a yield of 95.1%.

$^1$H NMR (400 MHZ, CDCl$_3$) δ 5.37-5.15 (m, 4H), 4.16-3.81 (m, 4H), δ 3.51-3.10 (m, 4H), 2.52 (s, 2H), 2.29 (q, J=7.2 Hz, 4H), 2.08-1.91 (m, 10H), 1.67-1.50 (m, 4H), 1.38-1.14 (m, 40H), 3.62-3.49 (m, 2H), 0.93-0.80 (m, 6H). C$_{43}$H$_{80}$NO$_9$P, MS (ES): m/z (M-Na$^-$) 784.04.

Example 2: Preparation Method of mRNA Lipid Composition

A) Preparation of Fluc DNA and eGFP DNA Templates

1) The luciferase (Luciferase protein CDS) or green fluorescent protein (GFP) circular plasmids were constructed into the pVAX1 vector (purchased from Thermo Fisher Scientific) using EcoRV enzyme digestion.

2) The plasmids constructed on the pVAX1 vector in step 1) were mixed with 50 μL of competent *Escherichia coli* cells Stbl2 (purchased from Thermo Fisher Scientific) and incubated in an ice bath for 30 minutes, followed by a 90-second heat shock at 42° C. The mixture was immediately placed back on ice for 2 minutes.

3) 400 μL of LB medium (purchased from Thermo Fisher Scientific) was added, and the mixture was incubated in a shaking incubator at 30° C. for 45 to 60 minutes with gentle shaking.

4) 50 to 100 μL of the bacterial solution was spread onto LB solid medium containing kanamycin antibiotic (100 μg/mL, purchased from Yeasen Biotechnology Co., Ltd.) and incubated overnight at 37° C. in an inverted position.

5) The resulting monoclonal colonies on the plate were sequenced to verify their correctness. A correctly sequenced monoclonal colony was selected and cultured overnight in a shaking incubator at 30° C. with gentle shaking.

6) Plasmid extraction was performed using an endotoxin-free plasmid extraction kit (purchased from Yeasen Biotechnology Co., Ltd.).

7) The extracted plasmid was digested with restriction endonucleases to obtain linearized plasmids for use as a transcription template. The specific enzyme digestion steps are provided as step 1 to step 3.

Step 1: 1 mg of luciferase circular plasmid was taken and digested at 37° C. for 4 hours with BspQ I enzyme (purchased from Yeasen Biotechnology Co., Ltd.) to produce the linearized DNA transcription template (see Table 1 for the enzyme digestion system).

TABLE 1

Enzyme digestion reaction system

| Reaction component | Final concentration/ Added volume |
|---|---|
| 10× Enzyme digestion buffer (mL) | 2 mL |
| BspQ I enzyme | 1 KU/mg |
| Luciferase circular plasmid | 50 μg/mL |
| Water for injection | Adjusted to 20 mL |

Step 2: After the reaction was completed, anhydrous ethanol and 3M sodium acetate were sequentially added at a volume ratio of V$_{(enzyme\ digestion\ product)}$:V$_{(anhydrous\ ethanol)}$:V$_{(3M\ sodium\ acetate)}$=1:3:1. The mixture was left to precipitate at −20° C. for 1 hour, then centrifuged at 12,000 rpm, and the precipitate was retained.

Step 3: The precipitate from step 2 was washed twice with 70% ethanol, dried at 55° C. for 10 minutes, then dissolved by adding 1.7 mL of water for injection.

The concentration of the linearized plasmid in the dissolved solution was 500 ng/μL, with a linearization rate of 90% or higher and a purification recovery efficiency of 85%.

B) Preparation of Fluc mRNA, eGFP mRNA, HA mRNA, and OVA mRNA

1) Co-Transcription and Capping Reaction:

Fluc DNA and eGFP DNA prepared in Example 1 (A) or HA DNA and OVA DNA purchased from Suzhou GENEWIZ Biotechnology Co., Ltd. were used as templates. NTP solutions (NTPs) and Cap1 capping analog (Catalog No.: 10678ES80, purchased from Yeasen Biotechnology Co., Ltd.) were used as starting materials. mRNA was synthesized via transcription using T7 RNA polymerase. The specific reaction system is shown in Table 2. The prepared reaction system was placed in a 37° C. incubator and shaken for 3 hours. The Cap1 capping analog used was Cap1-GAG, with the structure m7G (5') ppp (5') (2'-OMeA) pG, and its molecular formula was C$_{32}$H$_{43}$N$_{15}$O$_{24}$P$_4$.

TABLE 2

Co-transcription and capping reaction system

| Reaction components | | Final concentration/ Added volume |
|---|---|---|
| T7 transcription buffer (10X) | | T7 transcription buffer: 1/10 of the total volume, with a magnesium ion concentration of 40 mM |
| NTPs | ATP | 10 mM |
| | CTP | 10 mM |
| | GTP | 10 mM |
| | N1-methyl-Pseudo-UTP | 10 mM |
| Cap1 | | 10 mM |
| Linearized plasmid | | 50 μg/mL |
| Murine-derived RNase inhibitor | | 1 KU/mL |
| Inorganic pyrophosphatase | | Added 20-40 U per 1 mg of linearized plasmid |
| T7 RNA polymerase | | Added 150-300 KU per 1 mg of linearized plasmid |
| Water for injection | | Supplemented to the target final volume |

Note:
All the above reagents were purchased from Yeasen Biotechnology Co., Ltd.

2) Digestion of Template DNA:

After the reaction in step 1) was completed, DNase I (purchased from Yeasen Biotechnology Co., Ltd.) was added to the co-transcription and capping reaction system to achieve a final concentration of 1 U/μg linearized plasmid. The mixture was thoroughly mixed, centrifuged, and incubated at 37° C. for 1 hour to digest the template DNA, yielding the co-transcription and capping product.

3) Purification by Lithium Chloride Precipitation:

The co-transcription and capping product obtained from step 2) was purified using the lithium chloride precipitation, as follows:

Step 1. Adding lithium chloride: Lithium chloride solution (purchased from Thermo Fisher Scientific) was added to the product from step 2) to a final concentration of 2.8 M, and the mixture was precipitated at low temperature for 2 hours.

Step 2. Precipitation: The mixture was centrifuged at 12,000 rpm for 15 minutes, and the precipitate was retained.

Step 3. Washing: The precipitate was washed twice with 75% ethanol and dissolved in water for injection to obtain the mRNA solution. The purified mRNA solution was stored at −80° C.

C) Preparation of mRNA Compositions Using Lipid Compositions

1) Preparation of Lipid Composition Solution

General method 1: The components of the lipid composition (including permanently anionic lipids, permanently cationic lipids, and/or neutral lipids, or combinations thereof) were dissolved in ethanol according to the specified molar ratio to prepare an ethanol lipid complex solution (with a total lipid concentration of 100 to 600 mM). The ethanol lipid complex solution was rapidly added to RNase-free water using the ethanol injection method. After stirring for 30 minutes, the resulting lipid composition solution was filtered through a polycarbonate membrane with a pore size of 100 nm to 400 nm.

General method 2: Permanently anionic lipids or compounds were dissolved in RNase-free water to obtain RNase-free water containing permanently anionic lipids. Permanently cationic lipids and neutral lipids were dissolved in ethanol according to the specified molar ratio to prepare an ethanol lipid complex solution (with a total lipid concentration of 100 to 600 mM). The ethanol lipid complex solution was rapidly added to the RNase-free water containing permanently anionic lipids using the ethanol injection method. After stirring for 30 minutes, the resulting lipid composition solution was filtered through a polycarbonate membrane with a pore size of 100 nm to 400 nm.

2) mRNA Composition

The mRNA (prepared in Example 2) was diluted in a HEPES and EDTA solution to obtain an mRNA aqueous solution (concentration of 0.5 mg/mL, with a buffer of 10 mM HEPES and 0.1 mM EDTA, where EDTA was added to the aqueous HEPES as a chelating agent). A syringe was used to draw a sodium chloride solution (0.9% w/w in water) and inject it into the prepared mRNA aqueous solution. A syringe was used to draw the lipid complex solution and inject it into the mRNA and sodium chloride solution. The mixture was vortexed for 30 seconds and incubated at room temperature for 10 minutes to obtain the mRNA composition (with a final RNA concentration of 100 μg/mL), which was stored at 4° C. to 8° C.

3) Measurement of Particle Size and PDI

The mRNA composition was diluted with sodium chloride solution (0.9% w/w in water) at a 1:5 ratio, and the particle size and polydispersity index (PDI) were measured using dynamic light scattering with a Malvern laser particle size analyzer.

Example 3: Effect of Anionic Lipid Type on Particle Size and PDI of mRNA Compositions

TABLE 3

Structures of anionic lipids

| No. | Name | Whether phosphate group comprised | Structure | Source |
|---|---|---|---|---|
| 1 | ADOPE | Yes | 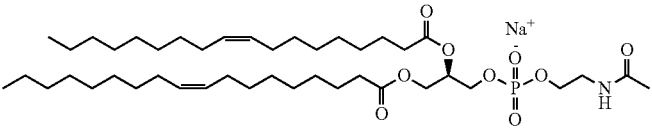 | Synthesized in Example 1 |
| 2 | 18PA | Yes | 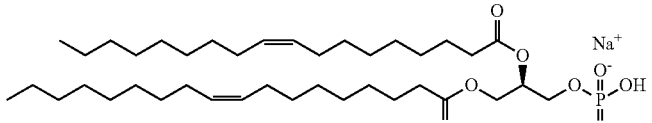 | Purchased from Adamas-beta |
| 3 | DOPG | Yes | 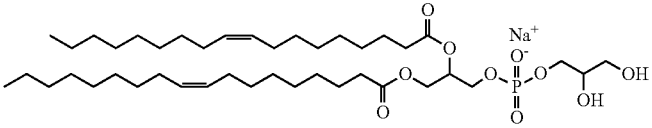 | Purchased from AVT (Shanghai) Pharmaceutical Technology Co., Ltd. |
| 4 | Tetradecyl phosphonic acid | Yes | 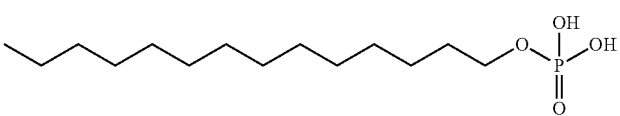 [SMILES: CCCCCCCCCCCCCCOP(=O)(O)O] | Purchased from Adamas-beta |
| 5 | Farnesyl pyrophosphate | Yes | 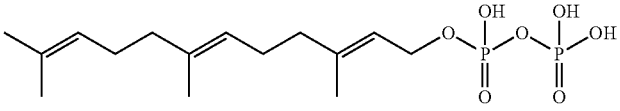 [SMILES: CC(C)=CCC/C(C)=C/CC/C(C)=C/COP(=O)(O)OP(=O)(O)O] | Purchased from Avanti |
| 6 | γ,γ-Dimethylallyl pyrophosphate | Yes | 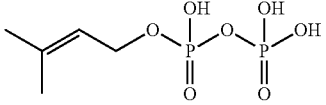 | Purchased from Avanti |

TABLE 3-continued

Structures of anionic lipids

| No. | Name | Whether phosphate group comprised | Structure | Source |
|---|---|---|---|---|
| 7 | pA(2'-O Me)mpG | Yes | | Purchased from Hongene Biotech |
| 8 | Oleic acid | No | | Purchased from Adamas-beta |
| 9 | Sodium dilaureth-7 citrate | No | | Purchased from Adamas-beta |
| 10 | Sodium lauryl sulfonate | No | | Purchased from Adamas-beta |

The following mRNA compositions were prepared using the method described in Example 2. Specifically, lipid complex solutions corresponding to No. 1 to No. 3 were prepared using method 1 (where the anionic lipid was dissolved in ethanol); lipid complex solutions corresponding to No. 4 to No. 7 were prepared using method 2 (where the anionic lipid was dissolved in water); lipid complex solutions corresponding to No. 8 to No. 10 were prepared using method 1. The molar ratio of permanently anionic lipids, permanently cationic lipid DOTMA, and neutral lipid DOPE in the different complexes was controlled at 1:2:1, and the particle size and PDI were measured.

The lipid complex solutions containing anions in Examples 4 to 11 were all prepared using method 1 from Example 2, and will not be further elaborated upon.

TABLE 4

Particle size and PDI of RNA compositions containing different permanently anionic lipids

| No. | Name | Particle size (nm) | PDI | Notes |
|---|---|---|---|---|
| 1 | ADOPE | 303.1 | 0.2455 | Soluble in ethanol, dissolved in ethanol during preparation |
| 2 | 18PA | 320.5 | 0.2158 | Soluble in ethanol, dissolved in ethanol during preparation |
| 3 | DOPG | 241.8 | 0.07632 | Soluble in ethanol, dissolved in ethanol during preparation |
| 4 | Tetradecylphosphonic acid | 330.7 | 0.4456 | Insoluble in ethanol, dissolved in water during preparation |
| 5 | Farnesyl pyrophosphate | 252.9 | 0.1123 | Insoluble in ethanol, dissolved in water during preparation |
| 6 | γ,γ-Dimethylallyl pyrophosphate | 245.1 | 0.09133 | Insoluble in ethanol, dissolved in water during preparation |
| 7 | pA(2'-OMe)mpG | 283.7 | 0.2000 | Insoluble in ethanol, dissolved in water during preparation |
| 8 | Oleic acid | 1280.6 | 0.4556 | Soluble in ethanol, dissolved in ethanol during preparation |

TABLE 4-continued

Particle size and PDI of RNA compositions containing different permanently anionic lipids

| No. | Name | Particle size (nm) | PDI | Notes |
|---|---|---|---|---|
| 9 | Sodium dilaureth-7 citrate | 1483.7 | 0.4261 | Soluble in ethanol, dissolved in ethanol during preparation |
| 10 | Sodium lauryl sulfonate | 2348.4 | 0.5237 | Soluble in ethanol, dissolved in ethanol during preparation |

The experimental results showed that permanently anionic lipids, particularly permanently anionic lipids containing phosphate groups such as ADOPE, 18PA, and DOPG, exhibited good solubility in ethanol. In contrast, tetradecylphosphonic acid, farnesyl pyrophosphate, γ,γ-dimethylallyl pyrophosphate, and ((2R,3S,4S,5R)-3-(((((2R,3R,4S,5R)-5-(2-amino-6-oxo-1,6-dihydro-9H-purin-9-yl)-3,4-dihydroxytetrahydrofuran-2-yl) methoxy) (hydroxy) phosphoryl)oxy)-5-(6-amino-9H-purin-9-yl)-4-methoxytetrahydrofuran-2-yl) methyl dihydrogen phosphate (pA (2'-OMe) mpG) showed lower solubility in ethanol. The compositions prepared in both ways had good particle size and PDI. ADOPE was the most preferred, with a particle size of 303.1 nm and a PDI as low as 0.2455, indicating good particle uniformity.

In contrast, compositions using other types of anionic lipids that do not contain phosphate groups, such as oleic acid, sodium dilaureth-7 citrate, and sodium lauryl sulfonate, resulted in significantly larger particle sizes exceeding 1000 nm and exhibited solid precipitation, making them unsuitable as mRNA delivery vectors.

Based on the above comparison, it can be concluded that by adding a permanently anionic lipid containing phosphate groups, a composition with good particle size (particle size controlled between 240 and 500 nm) and uniform particle distribution (PDI<0.5) may be obtained.

Example 4: Effect of Lipid Ratios on Particle Size and PDI of RNA Compositions

The following mRNA compositions containing permanently anionic lipids were prepared using the method described in Example 2, where the lipid complex solution was prepared using method 1 (i.e., permanently anionic lipids were dissolved in ethanol).

The molar ratios of permanently anionic lipid ADOPE, permanently cationic lipid DOTMA, and neutral lipid DOPE in the lipid complex solution and the amount of lipidosome solution were changed. The particle size and PDI were then measured.

TABLE 5

Particle size and PDI of compositions with different formulations

| No. | ADOPE | DOTMA | DOPE | Charge ratio | Particle size/nm | PDI |
|---|---|---|---|---|---|---|
| 1 | 10 mol % | 60 mol % | 30 mol % | 1:3 | 271.8 | 0.1345 |
| 2 | 10 mol % | 60 mol % | 30 mol % | 1:2 | 338.7 | 0.2342 |
| 3 | 14 mol % | 57 mol % | 29 mol % | 1:5 | 256.7 | 0.1483 |
| 4 | 14 mol % | 57 mol % | 29 mol % | 1:2 | 349.5 | 0.3026 |
| 5 | 20 mol % | 40 mol % | 40 mol % | 3:8 | 282 | 0.09943 |
| 6 | 20 mol % | 40 mol % | 40 mol % | 5:9 | 412.9 | 0.182 |
| 7 | 25 mol % | 50 mol % | 25 mol % | 3:8 | 337.6 | 0.1281 |
| 8 | 25 mol % | 50 mol % | 25 mol % | 3:5 | 445.8 | 0.4057 |
| 9 | 33 mol % | 45 mol % | 22 mol % | 1:5 | 343.8 | 0.1013 |
| 10 | 33 mol % | 45 mol % | 22 mol % | 1:2 | 475.5 | 0.3718 |
| 11 | 40 mol % | 50 mol % | 10 mol % | 1:6 | — | — |
| 12 | 40 mol % | 50 mol % | 10 mol % | 2:7 | — | — |
| 13 | 0 | 67 mol % | 33 mol % | 2:3 | 335.1 | 0.279 |

Note:
Charge ratio = (molar amount of positive charge carried by permanently cationic lipids − molar amount of negative charge carried by permanently anionic lipids)/[weight of mRNA (g) ÷ average molecular weight of bases 330 (g/mol)]. For No. 11 and No. 12, a large amount of solid precipitate formed during the preparation process, so particle size measurements were not conducted.

The experimental results showed that controlling the molar percentage of permanently anionic lipids, permanently cationic lipids, and neutral lipids in the range of (10 mol % to 33 mol %):(40 mol % to 60 mol %):(22 mol % to 40 mol %) resulted in compositions with relatively good particle size (particle size controlled within 240 to 500 nm) and PDI (less than 0.5), particularly when the proportion of permanently anionic lipids was between 10 to 33 mol %. When the amount of permanently anionic lipids exceeded the range of 10 to 33 mol %, such as 40 mol %, the system became unstable during the preparation process, leading to the formation of a large amount of solid particles.

Among them, the results indicated that even when no permanently anionic lipids were added (e.g., No. 13), it was also possible to prepare compositions with qualified particle size and PDI.

Example 5: Effect of Charge Ratios on Particle Size and PDI of RNA Compositions

The following Fluc-mRNA compositions were prepared using the method described in Example 2, where the lipid complex solution was prepared using method 1 (i.e., permanently anionic lipids were dissolved in ethanol).

The molar ratios of permanently anionic lipid ADOPE, permanently cationic lipid DOTMA, and neutral lipid DOPE in the lipid complex solution were kept the same, while the charge ratio was changed. The particle size and PDI were then measured.

TABLE 6

Particle size and PDI of compositions with different charge ratios

| No. | ADOPE | DOTMA | DOPE | Charge ratio | Particle size/nm | PDI |
|---|---|---|---|---|---|---|
| 1 | 25 mol % | 50 mol % | 25 mol % | 1:5 | 271.1 | 0.2382 |
| 2 | 25 mol % | 50 mol % | 25 mol % | 1:3 | 332 | 0.2624 |
| 3 | 25 mol % | 50 mol % | 25 mol % | 2:5 | 379.9 | 0.4536 |
| 4 | 25 mol % | 50 mol % | 25 mol % | 1:2 | 462.7 | 0.4281 |
| 5 | 25 mol % | 50 mol % | 25 mol % | 2:3 | — | — |
| 6 | 25 mol % | 50 mol % | 25 mol % | 3:4 | — | — |
| 7 | 20 mol % | 40 mol % | 40 mol % | 1:5 | 240.1 | 0.1072 |
| 8 | 20 mol % | 40 mol % | 40 mol % | 1:3 | 272.4 | 0.1169 |
| 9 | 20 mol % | 40 mol % | 40 mol % | 2:5 | 320.1 | 0.2365 |
| 10 | 20 mol % | 40 mol % | 40 mol % | 1:2 | 456.2 | 0.4144 |
| 11 | 20 mol % | 40 mol % | 40 mol % | 2:3 | — | — |
| 12 | 20 mol % | 40 mol % | 40 mol % | 3:4 | — | — |

TABLE 6-continued

Particle size and PDI of compositions with different charge ratios

| No. | ADOPE | DOTMA | DOPE | Charge ratio | Particle size/nm | PDI |
|---|---|---|---|---|---|---|
| 13 | 0 | 67 mol % | 33 mol % | 2:3 | 255.6 | 0.1793 |
| 14 | 0 | 67 mol % | 33 mol % | 2:3 | 478.5 | 0.4066 |

Note:
In the case of No. 5, 6, 11, and 12, large solid particles precipitated during preparation, and particle size was not measured. Charge ratio = (molar amount of positive charge carried by permanently cationic lipids − molar amount of negative charge carried by permanently anionic lipids)/[weight of mRNA (g) ÷ average molecular weight of bases 330 (g/mol)]. In No. 13, the amount of ethanol used for preparation of small-particle LPX-RNA without anionic lipids was the same as for No. 1 to No. 12. In No. 14, the amount of ethanol used for preparation of large-particle LPX-RNA without anionic lipids was 50% of that in No. 1 to No. 12.

The experimental results showed that when the charge ratio of the lipid composition was controlled within the range of 1:5 to 1:2, the resulting lipid compositions had good particle size (controlled between 240 to 500 nm) and uniform particle distribution (PDI<0.5).

For example, when the molar percentages of ADOPE, DOTMA, and DOPE in the lipid composition were 25:50:25, and the charge ratio was within the range of 1:5 to 1:2, the particle size increased with the charge ratio. When the charge ratio reached 1:2, the particle size was 462.7 nm. As the charge ratio further increased, such as in No. 5 and 6, where the charge ratios were 2:3 and 3:4, the system was unstable during preparation, resulting in large-particle solids precipitating in both cases.

Similarly, when the molar percentages of ADOPE, DOTMA, and DOPE in the lipid composition were 20:40:40, and the charge ratio was within the range of 1:5 to 1:2, the resulting lipid compositions had good particle size (controlled between 240 to 500 nm) and uniform particle distribution (PDI<0.5). As the charge ratio increased, both particle size and PDI increased as well. When the charge ratio was 1:2, the particle size and PDI were 456.2 nm and 0.4144, respectively. When the charge ratio exceeded the 1:5 to 1:2 range, such as in No. 11 and 12 with charge ratios of 2:3 and 3:4, large-particle solids precipitated.

Among them, the results indicated that even when no anionic lipids were added (e.g., No. 13 and 14), it was still possible to prepare compositions with qualified particle size and PDI. On this basis, in vivo protein expression experiments in mice and flow cytometry experiments on mouse spleen cells were conducted to continue the investigation.

Example 6: In Vivo Protein Expression Experiment in Mice

Preparation method for control LNP: The cationic lipid compound YK-009 (or YK-407), DSPC (purchased from AVT (Shanghai) Pharmaceutical Technology Co., Ltd.), cholesterol (purchased from AVT (Shanghai) Pharmaceutical Technology Co., Ltd.), and DMG-PEG2000 were dissolved in ethanol at a molar ratio of 49:10:39.5:1.5 to prepare an ethanol lipid solution. Using the ethanol injection method, the ethanol lipid solutions were quickly added to a citrate buffer (pH between 4 and 5), and vortexed for 30 seconds for later use. Fluc-mRNA was diluted in citrate buffer (pH between 4 and 5) to obtain a Fluc-mRNA aqueous solution. A certain volume of the lipid solution and the Fluc-mRNA aqueous solution were mixed to prepare liposomes at a weight ratio of total lipid to Fluc-mRNA of 10:1. The mixtures were sonicated at 25° C. for 15 minutes (ultrasonic frequency: 40 kHz, ultrasonic power: 800 W). The resulting liposomes were diluted 10-fold with PBS, followed by ultrafiltration using a 300 kDa ultrafiltration tube to remove ethanol. After adjusting the volume with PBS, the LNP preparations encapsulating Fluc-mRNA were obtained using the cationic lipid YK-009 (or YK-407)/DSPC/cholesterol/DMG-PEG2000 at a molar ratio of 49:10:39.5:1.5. Structures of YK-009 and YK-407:

TABLE 7

Chemical structures and sources of cationic lipids

| No. | Name | Structure | Notes |
|---|---|---|---|
| 1 | YK-009 | *[chemical structure]* | Non-targeted cationic lipid; Compound YK-009 in CN114044741B, with the synthesis method detailed in Example 1 |
| 2 | YK-407 | *[chemical structure]* | Spleen-targeted cationic lipid; Compound YK-407 in CN115784921B, with the synthesis method detailed in Example 1 |

The composition containing 20 μg of Fluc-mRNA with permanently anionic lipids prepared according to Example 2 (or the LNP preparation containing 20 μg of Fluc-mRNA with YK-009 or YK-407 prepared using the method described above) was injected via the tail vein into 4 to 6 week-old female BALB/c albino mice weighing 17 to 19 g. Six hours after administration, the mice were intraperitoneally injected with a fluorescent imaging substrate. The mice were allowed to move freely for 5 minutes, after which the total radiation intensity (corresponding to the fluorescent protein expression intensity, i.e., the protein expression level) of the protein expressed from the mRNA carried by the RNA composition in the mice in vivo was measured using the IVIS Spectrum small animal in vivo imaging system. After sampling, the mice were killed by cervical dislocation and dissected, and the internal organs: liver, spleen, and lung of mice were accurately isolated. The total radiation intensity (corresponding to the fluorescent protein expression intensity, i.e., the protein expression level) of the protein expressed from Fluc-mRNA in each organ of mice was measured using the IVIS Spectrum small animal in vivo imaging system. The detection results of in vivo imaging of the mice are shown in Table 8 and FIG. 1A, FIG. 1B, FIG. 1C, and FIG. 1D.

increased as the charge ratio increased. When the charge ratio was 1:2, the total radiation intensity in the mice reached $1.91 \times 10^7$ p/s, with the total radiation intensity in the spleen being significantly higher than that in the liver and lung. At a charge ratio of 1:2, the total radiation intensity in the spleen was the highest, $4.84 \times 10^7$ p/s, which was both 48.40 times that of the liver and lung. This indicated that the protein expression level of Fluc-mRNA delivered by the composition in the spleen was significantly higher than that in the liver and lung.

3) The experimental results of Examples 3 and 4 showed that even when no anionic lipids were added, it was still possible to prepare compositions with qualified particle size and PDI. However, the in vivo protein expression experi-

TABLE 8

In vivo imaging experimental data of mice

| | Lipid composition components and their contents (mol %/mol %) | | | | | | | | |
|---|---|---|---|---|---|---|---|---|---|
| | Permanently anionic lipid and | DOTMA | DOPE | Charge | Particle | Total radiation intensity ($\times 10^7$ p/s) | | | |
| No. | its content | content | content | ratio | size/nm | Mouse | Liver | Spleen | Lung |
| 1 | ADOPE10 | 60 | 30 | 1:3 | 271.8 | 0.61 | 0.11 | 0.52 | 0.10 |
| 2 | ADOPE10 | 60 | 30 | 1:2 | 338.7 | 0.67 | 0.10 | 0.59 | 0.09 |
| 3 | ADOPE14 | 57 | 29 | 1:5 | 256.7 | 1.21 | 0.12 | 1.62 | 0.10 |
| 4 | ADOPE14 | 57 | 29 | 1:2 | 349.5 | 1.64 | 0.11 | 2.84 | 0.10 |
| 5 | ADOPE25 | 50 | 25 | 1:5 | 271.1 | 1.38 | 0.10 | 2.09 | 0.10 |
| 6 | ADOPE25 | 50 | 25 | 1:3 | 332 | 2.24 | 0.11 | 4.85 | 0.10 |
| 7 | ADOPE25 | 50 | 25 | 2:5 | 379.9 | 2.19 | 0.13 | 7.38 | 0.11 |
| 8 | ADOPE25 | 50 | 25 | 1:2 | 462.7 | 2.32 | 0.14 | 6.47 | 0.11 |
| 9 | ADOPE20 | 40 | 40 | 1:5 | 240.1 | 0.74 | 0.10 | 1.54 | 0.09 |
| 10 | ADOPE20 | 40 | 40 | 1:3 | 272.4 | 0.83 | 0.10 | 1.20 | 0.10 |
| 11 | ADOPE20 | 40 | 40 | 2:5 | 320.1 | 1.70 | 0.11 | 2.55 | 0.10 |
| 12 | ADOPE20 | 40 | 40 | 1:2 | 456.2 | 1.91 | 0.10 | 4.84 | 0.10 |
| 13 | ADOPE33 | 45 | 22 | 1:5 | 343.8 | 2.12 | 0.10 | 3.09 | 0.10 |
| 14 | ADOPE33 | 45 | 22 | 1:2 | 475.5 | 1.96 | 0.11 | 3.24 | 0.11 |
| 15 | 18PA 25 | 50 | 25 | 1:2 | 401.3 | 1.98 | 0.12 | 6.72 | 0.11 |
| 16 | DOPG25 | 50 | 25 | 1:2 | 389.6 | 2.11 | 0.11 | 5.99 | 0.11 |
| 17 | 0 | 67 | 33 | 2:3 | 255.6 | 0.64 | 0.10 | 0.61 | 0.10 |
| 18 | YK-009-Fluc mRNA-LNP | | | | 67.3 | 3.86 | 1.22 | 0.78 | 0.04 |
| 19 | YK-407-Fluc mRNA-LNP | | | | 71.3 | 0.52 | 0.09 | 1.04 | 0.06 |

Note:
Charge ratio = (molar amount of positive charge carried by permanently cationic lipids − molar amount of negative charge carried by permanently anionic lipids)/[weight of mRNA (g) ÷ average molecular weight of bases 330 (g/mol)]. No. 17 represents small-particle LPX-RNA without the addition of anionic lipids.

Result analysis: (1) When the molar percentages of permanently anionic lipids, permanently cationic lipids, and neutral lipids were controlled at (14 mol % to 33 mol %):(40 mol % to 57 mol %):(22 mol % to 40 mol %) and the charge ratio was in the range of 1:2 to 1:5 (No. 3 to 14), the protein expression level of antigens in the spleen was significantly increased, demonstrating good targeting specificity of the composition to the spleen.

For example: 1) When the molar percentage of ADOPE, DOTMA, and DOPE was 25:50:25, the total radiation intensity in the mice increased as the charge ratio increased. When the charge ratio was 1:2, the total radiation intensity in the mice reached $2.32 \times 10^7$ p/s, with the total radiation intensity in the spleen being significantly higher than that in the liver and lung. At a charge ratio of 2:5, the total radiation intensity in the spleen was the highest, $7.38 \times 10^7$ p/s, which was 56.77 times and 67.09 times that of the liver and lung, respectively. This indicated that the protein expression level of Fluc-mRNA delivered by the composition in the spleen was significantly higher than that in the liver and lung.

2) When the molar percentage of ADOPE, DOTMA, and DOPE was 20:40:40, the total radiation intensity in the mice ments in mice indicated that the composition prepared without the addition of anionic lipids (No. 17) resulted in a total radiation intensity in the mice of $0.64 \times 10^7$ p/s. The radiation intensities in the liver, spleen, and lung were $0.10 \times 10^7$ p/s, $0.61 \times 10^7$ p/s, and $0.10 \times 10^7$ p/s, respectively. The radiation intensity was significantly lower than that of the compositions with the addition of permanently anionic lipids, and there was no significant difference in radiation intensity across different organs. This indicated that the protein expression level of the Fluc-mRNA delivered by the composition prepared without anionic lipids in the spleen was significantly reduced.

4) When the molar percentages of permanently anionic lipids, permanently cationic lipids, and neutral lipids exceeded the range of (14 mol % to 33 mol %):(40 mol % to 57 mol %):(22 mol % to 40 mol %), for example, when the molar percentage of ADOPE, DOTMA, and DOPE was 10 mol %:60 mol %:30 mol %, even with charge ratios of 1:3 or 1:2 (No. 1 and 2), the total radiation intensity in the spleen was only $0.52 \times 10^7$ p/s and $0.59 \times 10^7$ p/s, which was comparable to the radiation intensity of the composition prepared without anionic lipids (No. 17). This indicated that there was no significant difference in protein expression levels in the liver, spleen, and lung between the two set of compositions, and the targeting specificity to the spleen was comparable to that of the composition prepared without anionic lipids (No. 17), showing no improvement.

(2) When using other permanently anionic lipids (No. 15 and 16), such as 18PA and DOPG, the protein expression level of antigens in the spleen was also significantly increased under the above conditions, demonstrating strong and significant spleen-targeting effects.

For example, when the molar percentage of permanently anionic lipid, DOTMA, and DOPE was 25:50:25 and the charge ratio was 1:2, the total radiation intensity in mice reached $1.98 \times 10^7$ p/s and $2.11 \times 10^7$ p/s, respectively. The total radiation intensity in the spleen was $6.72 \times 10^7$ p/s and $5.99 \times 10^7$ p/s, which was 56 times and 54.45 times that of the liver, respectively, and 61.09 times and 54.45 times that of the lung, respectively.

(3) Compared with compositions without anionic lipids, the compositions comprising permanently anionic lipids designed in the present disclosure resulted in significantly increased protein expression levels in the spleen.

For example, the composition with a molar percentage of ADOPE, DOTMA, and DOPE of 25:50:25 and a charge ratio of 2:5 (No. 7) resulted in a total radiation intensity in the spleen that was 12.10 times that of the composition without anionic lipids (No. 17, small-particle LPX-RNA).

(4) Compared with LNPs from the prior art (No. 18 and 19), the compositions containing permanently anionic lipids designed in the present disclosure resulted in a significant increase in protein expression levels in the spleen, exhibiting strong spleen-targeting specificity. However, the protein expression level in the liver and lung was reduced (with a radiation intensity of about $0.1 \times 10^7$ p/s), or the compositions did not remain in the liver to express the target protein.

For example, the composition with a molar percentage of ADOPE, DOTMA, and DOPE of 25:50:25 and a charge ratio of 1:3 (No. 6) resulted in a total radiation intensity in the liver that was only 0.09 times that of YK-009-Fluc mRNA-LNP (No. 18), but the total radiation intensity in the spleen was 6.22 times that of YK-009-Fluc mRNA-LNP.

The composition with a molar percentage of ADOPE, DOTMA, and DOPE of 25:50:25 and a charge ratio of 2:5 (No. 7) resulted in a total radiation intensity in the spleen that was 7.1 times that of YK-407-Fluc mRNA-LNP (No. 19).

Conclusion:

The above experimental results demonstrated that the compositions prepared by adding permanently anionic lipids in the present disclosure could significantly enhance the protein expression level of the antigen in the spleen.

Example 7: Flow Cytometry Experiment on Mouse Spleen Cells

1. The composition containing 80 μg of eGFP-mRNA with ADOPE, prepared according to Example 2, was administered via tail vein injection into 4 to 6 week-old female C57BL/6 mice weighing 17 to 19 g. After 24 hours, the mice were killed by cervical dislocation and dissected to accurately separate the internal organs of the mice: the spleen.

2. Preparation of Single Cells 2.1. The spleen tissue was ground and passed through a cell strainer to convert the spleen tissue into single cells.

2.2. Red blood cell lysis buffer (4 mL, 10× volume) was added to lyse and remove red blood cells in the tissue.

2.3. Cell counting was performed, and $5 \times 10^6$ cells were taken and transferred to a flow cytometry tube (ensuring consistent cell numbers between samples).

3. Detection of Immune Cells in Spleen Tissue (8-Color Staining)

3.1. 100 μL of a surface antibody MIX was added to the single-cell suspension and incubated in the dark at room temperature for 15 minutes (one negative control).

TABLE 9

Reagents and sources for mouse spleen cell flow cytometry experiment

| Surface antibody - component | Brand | Volume/μL |
|---|---|---|
| PBS | — | 100 |
| Zombie NIR ™ Fixable Viability Kit | Biolegend | 1 |
| PerCP anti-mouse CD45 | Biolegend | 1 |
| Alexa Fluor ® 700 anti-mouse CD3 | Biolegend | 1 |
| BV650 Mouse Anti-Mouse NK-1.1 | BD | 1 |
| Brilliant Violet 605 ™ anti-mouse CD19 | Biolegend | 1 |
| APC anti-mouse F4/80 | Biolegend | 1 |
| PE/Cyanine7 anti-mouse CD11c | Biolegend | 1 |
| PE anti-mouse CD317 (BST2, PDCA-1) | Biolegend | 1 |

3.2. 2 mL of PBS was added, and the mixture was centrifuged at 500 g for 5 minutes.

The supernatant was discarded.

3.3. The cells were resuspended in 200 μL of PBS, filtered through a 200-mesh nylon net, and analyzed using the Cytoflex S flow cytometer. The percentage of GFP-positive cells in each cell line was analyzed. The detection sequence for each cell line was as follows:

T cell GFP percentage: $CD45^+ \rightarrow CD3^+ \rightarrow GFP^+$

B cell GFP percentage: $CD45^+ \rightarrow CD3^- CD19^+ \rightarrow GFP^+$

NK cell GFP percentage: $CD45^+ \rightarrow NK1.1^+ \rightarrow GFP^+$ cDC cell GFP percentage: $CD45^+ \rightarrow F4/80^- CD11c^+ \rightarrow GFP^+$ pDC cell GFP percentage: $CD45^+ \rightarrow F4/80^- CD11c^{int}$ $(CD317^+ \rightarrow GFP^+$ Macrophage GFP percentage: $CD45^+ \rightarrow F4/80^+ \rightarrow GFP^+$

TABLE 10

Percentage of eGFP-positive cells in mouse spleen

| | Sample | | | | | Percentage of eGFP-positive cells (%) | | | | | |
|---|---|---|---|---|---|---|---|---|---|---|---|
| | Permanently anionic | Permanently cationic | Neutral | | | | | | | | |
| Name | lipid (mol %) | lipid (mol %) | lipid (mol %) | Charge ratio | Particle size/nm | T cell | B cell | NK cell | pDC cell | cDC cell | Macrophage |
| Blank control | / | / | / | / | / | 0.00 | 0.01 | 0.00 | 0.05 | 0.01 | 0.01 |

TABLE 10-continued

Percentage of eGFP-positive cells in mouse spleen

| | Sample | | | | | Percentage of eGFP-positive cells (%) | | | | | |
|---|---|---|---|---|---|---|---|---|---|---|---|
| | Permanently anionic | Permanently cationic | Neutral | | | | | | | | |
| Name | lipid (mol %) | lipid (mol %) | lipid (mol %) | Charge ratio | Particle size/nm | T cell | B cell | NK cell | pDC cell | cDC cell | Macrophage |
| 1 | ADOPE 25 | DOTMA 50 | DOPE 25 | 1:5 | 264.3 | 0.71 | 0.10 | 0.51 | 2.87 | 1.79 | 2.47 |
| 2 | ADOPE 25 | DOTMA 50 | DOPE 25 | 1:3 | 311.2 | 0.81 | 0.13 | 2.59 | 3.67 | 4.87 | 5.87 |
| 3 | ADOPE 25 | DOTMA 50 | DOPE 25 | 2:5 | 345.2 | 1.52 | 0.16 | 3.20 | 3.43 | 4.56 | 6.26 |
| 4 | ADOPE 25 | DOTMA 50 | DOPE 25 | 1:2 | 365.8 | 1.88 | 0.38 | 3.81 | 5.95 | 8.70 | 7.45 |
| 5 | ADOPE 20 | DOTMA 40 | DOPE 40 | 1:2 | 376.8 | 1.21 | 0.15 | 2.25 | 3.81 | 4.29 | 4.82 |
| 6 | ADOPE 14 | DOTMA 57 | DOPE 29 | 1:5 | 253.2 | 0.91 | 0.08 | 0.53 | 2.27 | 1.89 | 2.44 |
| 7 | ADOPE 14 | DOTMA 57 | DOPE 29 | 1:2 | 343.2 | 1.01 | 0.17 | 1.12 | 3.23 | 2.78 | 2.39 |
| 8 | ADOPE 33 | DOTMA 45 | DOPE 55 | 1:5 | 313.2 | 1.24 | 0.18 | 2.65 | 3.21 | 3.28 | 3.66 |
| 9 | ADOPE 33 | DOTMA 45 | DOPE 55 | 1:2 | 421.7 | 1.54 | 0.21 | 3.11 | 4.42 | 4.64 | 4.21 |
| 10 | ADOPE 10 | DOTMA 60 | DOPE 30 | 1:2 | 362.8 | 0.52 | 0.03 | 0.27 | 1.93 | 1.12 | 0.58 |
| 11 | 18PA 25 | DOTMA 50 | DOPE 25 | 1:2 | 384.8 | 1.32 | 0.18 | 3.33 | 3.00 | 4.53 | 4.68 |
| 12 | DOPG 25 | DOTMA 50 | DOPE 25 | 1:2 | 392.7 | 1.41 | 0.15 | 3.34 | 4.52 | 3.74 | 4.12 |
| 13 | / | DOTMA 67 | DOPE 33 | 2:3 | 272.8 | 0.10 | 0.02 | 0.25 | 2.10 | 1.08 | 0.63 |
| 14 | pA(2'-OMe)mpG 25 | DOTMA 50 | DOPE 25 | 1:3 | 324.4 | 0.41 | 0.08 | 0.20 | 1.07 | 0.72 | 0.64 |

Note:
No. 13 corresponds to the small-particle LPX-RNA prepared without the addition of anionic lipids.

Results analysis: Antigen-presenting cells refer to immune cells that can present antigens to lymphocytes, including dendritic cells (DC cells), B lymphocytes, and macrophages, which play a crucial role in the human body. Their primary functions include immune recognition, immune response, and immune regulation.

In the compositions containing ADOPE (No. 1 to 9), where the molar ratio of ADOPE, DOTMA, and DOPE was controlled within (14 mol % to 33 mol %):(40 mol % to 57 mol %):(22 mol % to 40 mol %), and the charge ratio was 1:2 to 1:5; or when other permanently anionic lipids, including but not limited to 18PA (No. 11) or DOPG (No. 12), were used, the percentage of cells that express the antigen among antigen-presenting cells (such as B cells, pDC cells, cDC cells, and macrophages) in the spleen was significantly increased. For example:

1. Compared with the blank control, the composition labeled No. 2 (ADOPE:DOTMA:DOPE=25 mol %:50 mol %:25 mol %, charge ratio=1:3) increased the percentages of eGFP-positive cells in spleen antigen-presenting cells by 0.12% in B cells, 3.62% in pDC cells, 4.86% in cDC cells, and 5.86% in macrophages, respectively. The composition labeled No. 3 (ADOPE:DOTMA:DOPE=25 mol %:50 mol %:25 mol %, charge ratio=2:5) increased these percentages by 0.15%, 3.38%, 4.55%, and 6.25%, respectively. The composition labeled No. 4 (ADOPE:DOTMA:DOPE=25 mol %:50 mol %:25 mol %, charge ratio=1:2) increased these percentages by 0.37%, 5.90%, 8.69%, and 7.44%, respectively. The composition labeled No. 5 (ADOPE:DOTMA:DOPE=20 mol %:40 mol %:40 mol %, charge ratio=1:2) increased these percentages by 0.14%, 3.76%, 4.28%, and 4.81%, respectively. The composition labeled No. 9 (ADOPE:DOTMA:DOPE=33 mol %:45 mol %:55 mol %, charge ratio=1:2) increased these percentages by 0.20%, 4.37%, 4.63%, and 4.20%, respectively.

When using other permanently anionic lipids, compared with the blank control, the composition with 18PA (No. 11) increased the percentage of eGFP-positive cells by 0.17%, 2.95%, 4.52%, and 4.67%, respectively, while the composition with DOPG (No. 12) increased these percentages by 0.14%, 4.47%, 3.73%, and 4.11%, respectively.

2. Compared with the small-particle LPX-RNA without the addition of anionic lipids (No. 13), the compositions with ADOPE (No. 1 to 9) could significantly increase the percentage of cells that express the antigen among antigen-presenting cells (e.g., B cells, pDC cells, cDC cells, macrophages) in the spleen.

For example, compared with the small-particle LPX-RNA without the addition of anionic lipids (No. 13), the composition with ADOPE (No. 2) increased the percentages of eGFP-positive cells in spleen antigen-presenting cells by 6.5-fold for B cells, 1.7-fold for pDC cells, 4.5-fold for cDC cells, and 9.3-fold for macrophages, respectively; the composition with ADOPE (No. 3) increased these percentages by 8-fold, 1.6-fold, 4.2-fold, and 9.9-fold, respectively; the composition with ADOPE (No. 4) increased these percentages by 19-fold, 2.8-fold, 8.1-fold, and 11.8-fold, respectively; the composition with ADOPE (No. 5) increased these percentages by 7.5-fold, 1.8-fold, 4-fold, and 7.7-fold, respectively; and the composition with ADOPE (No. 9) increased these percentages by 10.5-fold, 2.1-fold, 4.3-fold, and 6.7-fold, respectively.

When using other permanently anionic lipids, compared with the small-particle LPX-RNA without the addition of anionic lipids (No. 13), the composition with 18PA (No. 11) increased these percentages by 9-fold, 1.4-fold, 4.2-fold, and 7.4-fold, respectively; while the composition with DOPG (No. 12) increased these percentages by 7.5-fold, 2.2-fold, 3.5-fold, and 6.5-fold, respectively.

3. Compared with other eGFP RNA compositions containing pA (2'-OMe) mpG (comprising permanently anionic lipid pA (2'-OMe) mpG, permanently cationic lipid DOTMA, and neutral lipid DOPE), the compositions with ADOPE (No. 1 to 9) significantly increased the percentage of cells that express the antigen among antigen-presenting cells (e.g., B cells, pDC cells, cDC cells, macrophages).

For example, the composition with ADOPE (No. 2) increased the percentages of eGFP-positive cells in spleen antigen-presenting cells by 1.6-fold for B cells, 3.4-fold for pDC cells, 6.8-fold for cDC cells, and 9.2-fold for macrophages, respectively; the composition with ADOPE (No. 3) increased these percentages by 2-fold, 3.2-fold, 6.3-fold, and 9.8-fold, respectively; the composition with ADOPE (No. 4) increased these percentages by 4.8-fold, 5.6-fold, 12.1-fold, and 11.6-fold, respectively; the composition with ADOPE (No. 5) increased these percentages by 1.9-fold, 3.6-fold, 6-fold, and 7.5-fold, respectively; and the composition with ADOPE (No. 9) increased these percentages by 2.6-fold, 4.1-fold, 6.4-fold, and 6.6-fold, respectively.

When using other permanently anionic lipids in the present disclosure, compared with other eGFP RNA compositions containing pA (2'-OMe) mpG (comprising permanently anionic lipid pA (2'-OMe) mpG, permanently cationic lipid DOTMA, and neutral lipid DOPE), the composition with 18PA (No. 11) increased these percentages by 2.3-fold, 2.8-fold, 6.3-fold, and 7.3-fold, respectively. The composition with DOPG (No. 12) increased these percentages by 1.9-fold, 4.2-fold, 5.2-fold, and 6.4-fold, respectively.

4. When the molar ratio of ADOPE, DOTMA, and DOPE and/or the charge ratio exceeded the aforementioned ranges, the percentage of cells that express the antigen among antigen-presenting cells (e.g., B cells, pDC cells, cDC cells, and macrophages) in the spleen did show a certain level of increase, but the effect was significantly reduced compared to the above examples. For example:

In composition No. 10 (ADOPE:DOTMA:DOPE=10 mol %:60 mol %:30 mol %, charge ratio=4:9), compared with the blank control, the percentage of eGFP-positive cells among antigen-presenting cells such as B cells, pDC cells, cDC cells, and macrophages in the spleen showed an increasing trend. However, when compared with the small-particle LPX-RNA without the addition of anionic lipids (No. 13), there was no significant difference in the percentage of eGFP-positive cells among antigen-presenting cells such as B cells, pDC cells, cDC cells, and macrophages in the spleen, indicating that adding a small amount of ADOPE did not produce a significant effect on the targeting of antigen-presenting cells.

Conclusion:

Based on the above experimental results, it was found that the composition prepared by adding permanently anionic lipids, permanently cationic lipids, and neutral lipids in the present disclosure significantly increased the percentage of cells that express the antigen among antigen-presenting cells (such as B cells, pDC cells, cDC cells, and macrophages) in the spleen.

Example 8: Comparative Experiment Between ADOPE-Containing RNA Composition and Large-Particle LPX-RNA According to the related patent for LPX-RNA (authorized publication number: CN109331176B), the luciferase activity in the spleen of mice showed differences after injection with luciferase-RNA liposome compositions of different sizes, with larger liposome compositions exhibiting higher activity. Following the preparation method in CN109331176B, the ethanol content used in the preparation of LPX-RNA was reduced by 50% to prepare large-particle LPX-RNA compositions. This example compares the differences between the ADOPE-containing composition and the large-particle LPX-RNA composition in terms of in vivo imaging of mice and the percentage of eGFP-positive cells in mouse spleen cells, etc.

TABLE 11

Comparison of in vivo imaging experimental data between the composition containing a permanently anionic lipid and the large-particle LPX-RNA composition without anionic lipids in mice

| | Molar percentage of lipid composition (mol %) | | | | | Total radiation intensity ($\times 10^7$ p/s) | | | |
|---|---|---|---|---|---|---|---|---|---|
| No. | Permanently anionic lipid | DOTMA | DOPE | Particle size/nm | Charge ratio | Mouse | Liver | Spleen | Lung |
| 1 | ADOPE 25 | 50 | 25 | 379.9 | 2:5 | 2.19 | 0.13 | 7.38 | 0.11 |
| 2 | 0 | 67 | 33 | 478.5 | 2:3 | 0.92 | 0.10 | 1.94 | 0.10 |

Note:
No. 2 corresponds to the large-particle LPX-RNA without anionic lipids.

Results analysis: As shown in Table 11, compared with the composition of large-particle LPX-RNA without anionic lipids (No. 2, particle size of 478.5 nm), the composition containing the permanently anionic lipid ADOPE (No. 1, particle size of 379.9 nm) resulted in a total radiation intensity in mice that was 2.4 times that of No. 2, and the total radiation intensity in the spleen was 3.8 times that of No. 2. This indicated that the differences in the in vivo imaging of mice between the two compositions were primarily due to the addition of ADOPE, the impact of particle size was not obvious. In other words, the composition prepared by adding a permanently anionic lipid could significantly increase the protein expression level of the antigen in the spleen, demonstrating good and significant spleen-targeting effects.

TABLE 12

Comparison of the percentage of eGFP-positive cells in mouse spleen cells between the composition containing a permanently anionic lipid and the large-particle LPX-RNA composition without anionic lipids

| | Sample | | | | Percentage of eGFP-positive cells (%) | | | | | |
|---|---|---|---|---|---|---|---|---|---|---|
| No. | Permanently anionic lipid (mol %) | Permanently cationic lipid (mol %) | Neutral lipid (mol %) | Charge ratio | Particle size/nm | T cell | B cell | NK cell | pDC cell | cDC cell | Macrophage |
| 1 | ADOPE 25 | DOTMA 50 | DOPE 25 | 1:2 | 365.8 | 1.88 | 0.38 | 3.81 | 5.95 | 8.70 | 7.45 |
| 2 | / | DOTMA 67 | DOPE 33 | 2:3 | 418.8 | 0.65 | 0.08 | 1.65 | 2.53 | 2.34 | 3.26 |

Note:
No. 2 corresponds to the large-particle LPX-RNA.

Figure 2A:
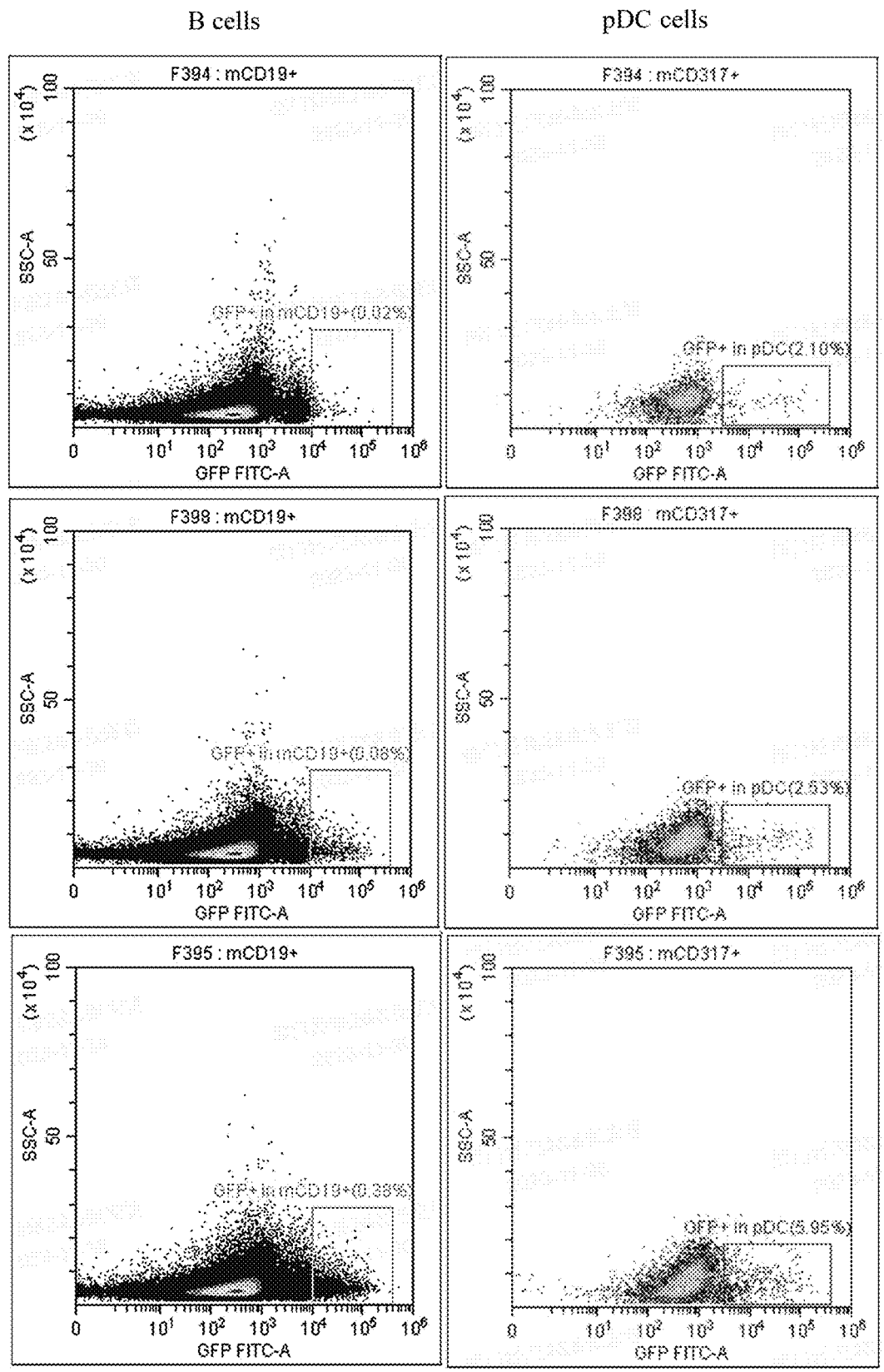
FIG. 2A and FIG. 2B show flow cytometry images of mouse spleens corresponding to small-particle LPX without anionic lipids (No. 13 in Table 10), large-particle LPX without anionic lipids (No. 2 in Table 12), and the composition comprising eGFP-mRNA (No. 1 in Table 12).
Figure 2B:
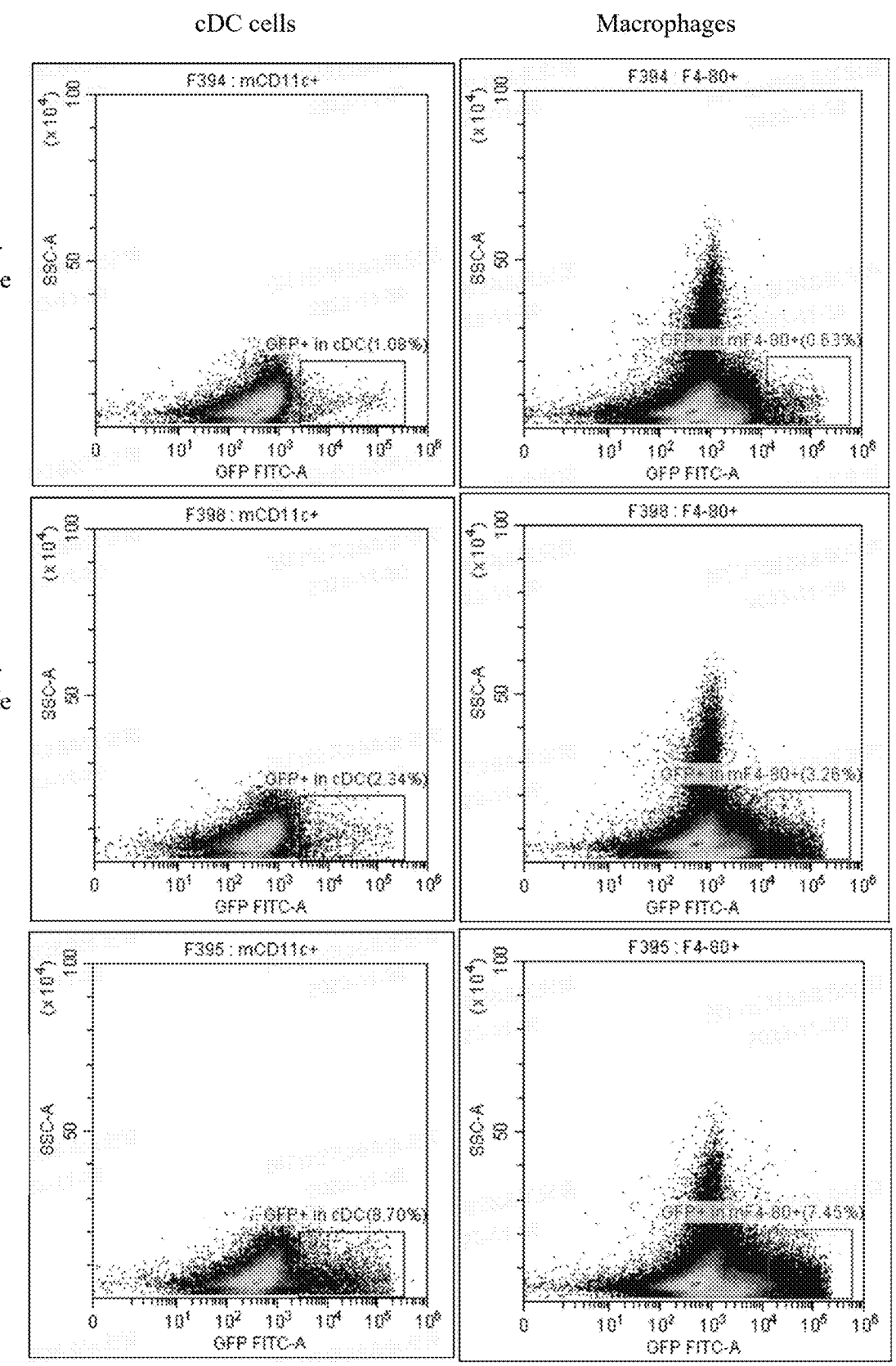

Results analysis: As shown in Table 12 and FIG. 2A and FIG. 2B, with comparable particle sizes, compared with the LPX-RNA composition without anionic lipids (No. 2, particle size of 418.8 nm), the composition containing permanently anionic lipid ADOPE (No. 1, particle size of 365.8 nm) increased the percentages of eGFP-positive cells in antigen-presenting cells by 4.8-fold for B cells, 2.4-fold for pDC cells, 3.7-fold for cDC cells, and 2.3-fold for macrophages, respectively.

The experimental results indicated that the addition of permanently anionic lipids (e.g., ADOPE) could significantly increase the percentage of cells that express the antigen among antigen-presenting cells (e.g., B cells, pDC cells, cDC cells, and macrophages).

Summary: These results further confirmed that the mRNA composition containing a permanently anionic lipid, as designed in the present disclosure, could accumulate in the mouse spleen. The protein expression level of the delivered mRNA in the spleen of mice was significantly higher compared with compositions without anionic lipids and other delivery technologies in the prior art. Additionally, the percentage of cells that express the antigen among antigen-presenting cells (e.g., B cells, pDC cells, cDC cells, and macrophages) was significantly increased.

Example 9: Levels of IFN-α Cytokine Stimulated by ADOPE-Containing RNA Compositions Interferon-α (IFN-α) is a critical cytokine that plays an important role in the body's immune system. It exhibits multiple functions such as antiviral, antitumor, inhibition of hematopoietic cell proliferation, and immune regulation, with therapeutic effects on various diseases. IFN-α is usually produced by APC cells in the context of RNA virus infection by sensing double-stranded RNA (dsRNA) and single-stranded RNA (ssRNA) through endosomal TLR3 and TLR7, respectively, and is essential for an effective inflammatory and antiviral environment.

LPX-HA mRNA (an mRNA vaccine for influenza prevention) (40 µg) prepared according to Example 2, or ADOPE-containing HA mRNA composition (40 µg) was injected into the tail vein of C57BL/6J mice. Blood samples were collected 6 hours and 24 hours after injection to measure serum IFN-α levels using ELISA. Each parallel group included three mice. At the same time, mice injected with an equal volume of blank lipid solution were set as the blank group.

Animals: C57BL/6 mice were sourced from Jackson Laboratory. Female matched animals, 8 to 10 weeks old, were used throughout the experiment.

ELISA assay: Mouse IFN-α levels in serum were measured using a standard ELISA assay following the manufacturer's instructions (PBL).

TABLE 13

Comparison of IFN-α cytokine stimulated by RNA compositions containing permanently anionic lipids and LPX-HA mRNA compositions without permanently anionic lipids

| | Sample | | | | | IFN-α cytokine (pg/mL) | | | | | |
|---|---|---|---|---|---|---|---|---|---|---|---|
| | | | | | | 6 hours | | | 24 hours | | |
| No. | Permanently anionic lipid (mol %) | Permanently cationic lipid (mol %) | Neutral lipid (mol %) | Charge ratio | Particle size/nm | Mouse 1 | Mouse 2 | Mouse 3 | Mouse 1 | Mouse 2 | Mouse 3 |
| 1 | ADOPE 25 | DOTMA 50 | DOPE 25 | / | 231.7 | 13 | 17 | 13 | 15 | 19 | 15 |
| 2 | ADOPE 25 | DOTMA 50 | DOPE 25 | 2:5 | 325.7 | 6824 | 6490 | 6388 | 228 | 229 | 218 |
| 3 | ADOPE 25 | DOTMA 50 | DOPE 25 | 1:2 | 352.5 | 9015 | 12712 | 9601 | 442 | 567 | 411 |
| 4 | / | DOTMA 67 | DOPE 33 | 2:3 | 384.1 | 3585 | 3220 | 3327 | 122 | 114 | 137 |

Note:
No. 4 corresponds to the large-particle LPX-RNA.

Figure 3:
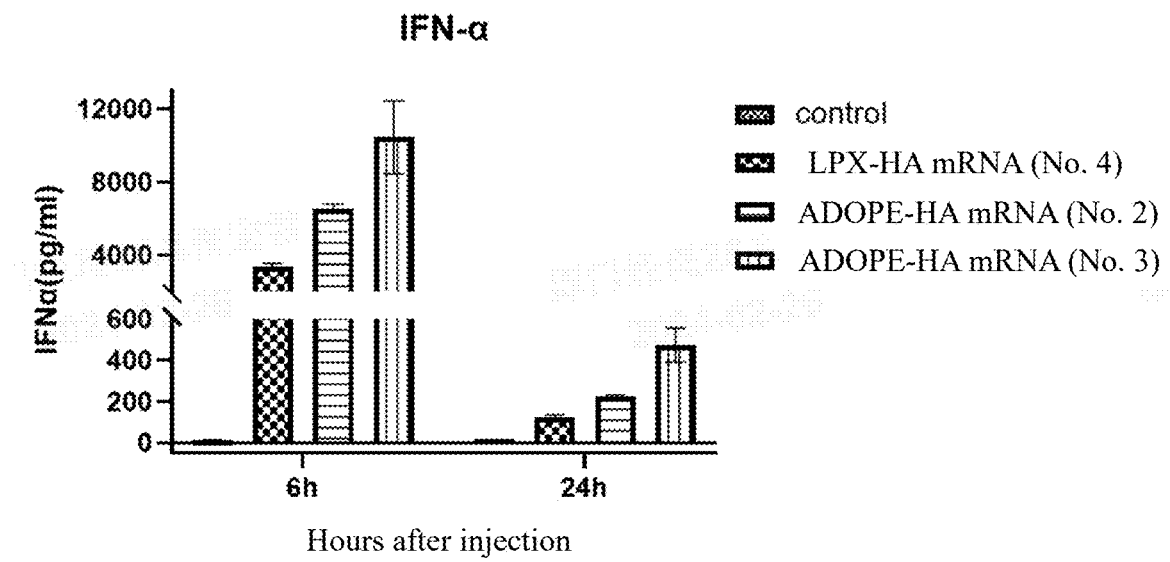
FIG. 3 shows a comparative image of the IFN-α cytokine content stimulated by different compositions from No. 1 to 4 in Table 13 at various time points.

Results analysis: As shown in Table 13 and FIG. 3, under comparable particle sizes, compared with the LPX-RNA composition without anionic lipids (No. 4, particle size of 384.1 nm), the compositions containing the permanently anionic lipid ADOPE (No. 2, particle size of 325.7 nm) and (No. 3, particle size of 352.5 nm) resulted in serum average IFN-α cytokine levels that were 1.9 times and 3.1 times that of the LPX-RNA composition without anionic lipids (No. 4)

at 6 hours post-injection, and serum average IFN-α cytokine levels that were 1.8 times and 3.8 times that of the LPX-RNA composition without anionic lipids (No. 4) at 24 hours post-injection.

The experimental results indicated that by detecting the levels of IFN-α cytokine stimulated by the composition containing ADOPE, it could be proved that the composition of the present disclosure could initiate a robust Type I IFN-driven immune stimulation program, with significantly higher stimulation levels compared to LPX-RNA.

Example 10: Antigen-Specific Cytotoxic T Cells Stimulated by ADOPE-Containing RNA Compositions The strength of the T cell effect generated by the tumor mRNA-liposome complex can be judged by detecting antigen-specific $CD8^+$ cytotoxic T cells ($CD8^+$ T cells) in the serum, which is critical for the antitumor effect of lipid complexes delivering tumor mRNA.

C57BL/6J mice were vaccinated via tail vein injection on day 0, day 3, and day 8 with the LPX-ovalbumin (OVA) mRNA (40 μg) or the OVA mRNA (40 μg) composition containing ADOPE, prepared according to Example 2 (each mouse was injected with 40 μg of OVA-mRNA per vaccination). At the same time, mice injected with an equal volume of diluted blank lipid solution were set as the control group, with 3 mice per group in parallel.

On day 13 (the 5th day after the third immunization), about 200 μL of whole blood was collected, and the percentage of OVA antigen-specific $CD8^+$ T cells within the total $CD8^+$ T cells was determined by flow cytometry. Specific operations:

1. 100 μL of whole blood was collected into a flow cytometry tube (A blank control was required.)
2. 100 μL of pre-mixed surface antibody solution was added, and the mixture was thoroughly blended by pipetting. The mixture was incubated at room temperature in the dark for 15 minutes. The components of the pre-mixed solution are as follows and are added sequentially according to Table 14 below during preparation:

TABLE 14

Experimental reagents and sources for detecting OVA antigen-specific $CD8^+$ T cells

| Surface antibody - component | Manufacturer | Volume (μL) |
| --- | --- | --- |
| PBS | — | 100 |
| APC anti-mouse H-2Kb bound to SIINFEKL Antibody | Biolegend | 3 |
| PerCP/Cyanine5.5 anti-mouse CD8a | Biolegend | 3 |
| FITC anti-mouse CD3 | eBioscience | 3 |

3. 2 mL of 1×RBC Lysis Buffer was added, incubated in the dark for 10 minutes, and centrifuged at 500 g for 5 minutes. The supernatant was discarded.
4. Another 2 mL of 1×RBC Lysis Buffer was added, followed by centrifugation at 500 g for 5 minutes. The supernatant was discarded.
5. 200 μL of PBS was added, and the mixture was transferred into a clean, labeled EP tube for analysis in the machine. Single-color compensation beads were used to adjust compensation before analysis. The detection sequence was as follows: $CD3^+ \rightarrow CD8^+ \rightarrow$ APC anti-mouse H-2 Kb bound to SIINFEKL

TABLE 15

Percentage of OVA antigen-specific T cells stimulated by RNA compositions containing permanently anionic lipids and LPX-RNA compositions without anionic lipids

| | Sample | | | | Percentage of OVA antigen-specific T cells in $CD8^+$ T cells (%) Day 13 of injection | | |
| --- | --- | --- | --- | --- | --- | --- | --- |
| No. | Permanently anionic lipid (mol %) | Permanently cationic lipid (mol %) | Neutral lipid (mol %) | Charge ratio | Particle size/nm | Mouse 1 | Mouse 2 | Mouse 3 |
| 1 | ADOPE 25 | DOTMA 50 | DOPE 25 | / | 226.5 | 1.24 | 2.35 | 0.26 |
| 2 | ADOPE 25 | DOTMA 50 | DOPE 25 | 2:5 | 333.1 | 52.3 | 60.1 | 64.1 |
| 3 | ADOPE 25 | DOTMA 50 | DOPE 25 | 1:2 | 356.3 | 62.7 | 69.3 | 75.2 |
| 4 | / | DOTMA 67 | DOPE 33 | 2:3 | 373.4 | 35.2 | 43.5 | 39.3 |

Note:
No. 4 corresponds to the large-particle LPX-RNA.

Figure 4:
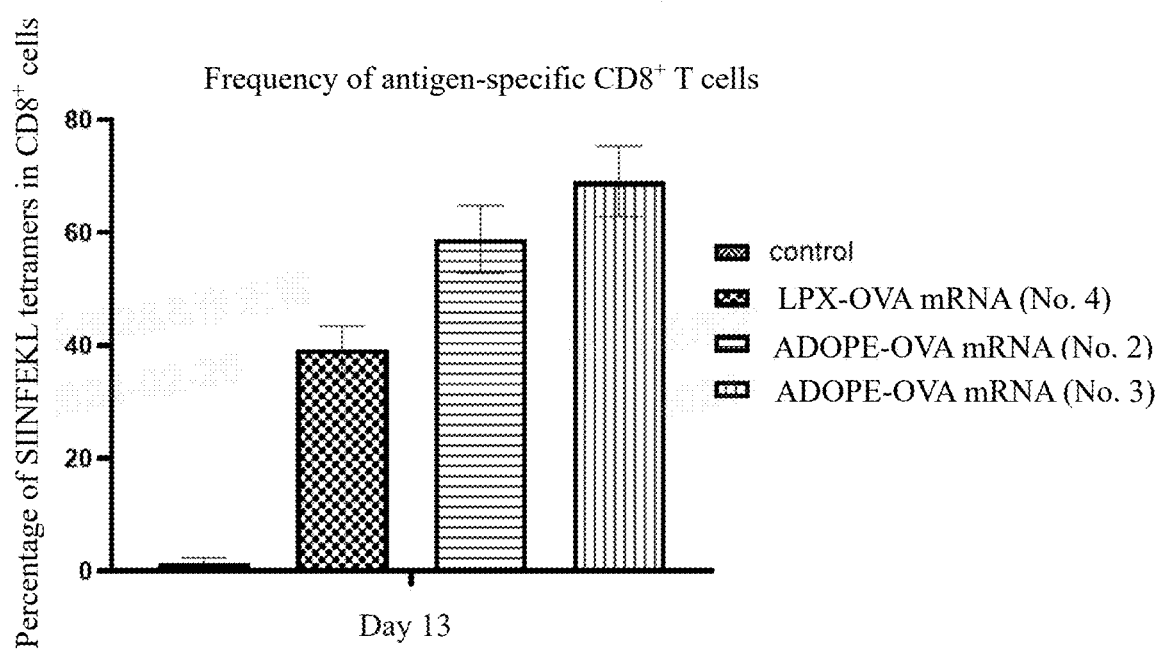
FIG. 4 shows a comparative image of antigen-specific cytotoxic T cells stimulated by different compositions from No. 1 to 4 in Table 15 on the 13th day after injection of the pharmaceutical composition.

Results analysis: As shown in Table 15 and FIG. 4, under comparable particle sizes, compared with the LPX-RNA composition without anionic lipids (No. 4, particle size of 373.4 nm), the compositions containing the permanently anionic lipid ADOPE (No. 2, particle size of 333.1 nm) and (No. 3, particle size of 356.3 nm) resulted in average percentages of OVA antigen-specific $CD8^+$ T cells in total $CD8^+$ T cells that were about 1.5 and 1.8 times that of the LPX-RNA composition without anionic lipids (No. 4, particle size of 373.4 nm) in the serum on day 13 post-injection.

The experimental results indicated that by detecting the antigen-specific cytotoxic T cells stimulated by the composition containing ADOPE, it could be proved that the composition of the present disclosure could produce a very strong T cell effect, with stimulation levels significantly higher than those of LPX-RNA.

Example 11: Therapeutic Effect of ADOPE-Containing Composition on Tumor-Bearing Mouse Model 1) Establishment of the B16F10-OVA melanoma mouse model: Before the study, female C57BL/6J mice, aged between 6 to 8 weeks, were acclimated for at least three days. The mice were given free access to food and sterile water, and were housed under a 12-hour light/dark cycle at 22° C.±2° C. and 55%±15% relative humidity. B16F10-OVA cells were cultured at 37° C. in 5% $CO_2$ complete medium, as described in the product instructions. The cells were collected using 0.25% trypsin-EDTA, then suspended in Dulbecco's Phosphate Buffered Saline (DPBS), and subcutaneously (SC) implanted into the flanks of female C57BL/6J mice at a concentration of $2\times10^5$ cells/100 μL/mouse to establish a subcutaneous B16F10-OVA tumor model. Vaccination was initiated when the tumor volume reached approximately 100 mm³.

2) Vaccination: C57BL/6J mice in the group were vaccinated via tail vein injection on day 10, day 13, and day 17 post-cell injection with either the LPX-OVA mRNA (40 μg) or the ADOPE-containing OVA mRNA composition (40 μg) prepared according to Example 3. Each mouse was injected with 40 μg of mRNA-OVA therapeutic agent per vaccination. Mice injected with an equivalent volume of blank lipid solution were set as the control group, with 8 mice per group in parallel.

TABLE 16

Tumor treatment using the composition containing a permanently anionic lipid and the large-particle LPX-RNA composition without anionic lipids

| No. | Permanently anionic lipid (mol %) | Permanently cationic lipid (mol %) | Neutral lipid (mol %) | Charge ratio | Particle size/nm | Vaccination time | | |
|---|---|---|---|---|---|---|---|---|
| 1 | / | / | / | / | 261.2 | d 10 | d 13 | d 17 |
| 2 | ADOPE 25 | DOTMA 50 | DOPE 25 | 2:5 | 330.5 | d 10 | d 13 | d 17 |
| 3 | ADOPE 25 | DOTMA 50 | DOPE 25 | 1:2 | 342.6 | d 10 | d 13 | d 17 |
| 4 | / | DOTMA 67 | DOPE 33 | 2:3 | 337.4 | d 10 | d 13 | d 17 |

Note:
No. 4 corresponds to the large-particle LPX-RNA.

3) Tumor size and mouse survival rate: Starting from day 7 post-tumor inoculation, the tumor diameter was measured three times per week. The tumor volume in C57BL/6J mice was calculated using the following formula: V (mm³)=x× y²/2, with the unit in millimeters, where V represents the tumor volume, x is the tumor's longest diameter, and y is the tumor's shortest diameter. At the same time, the body weight of the C57BL/6J mice was recorded three times per week using an electronic balance. Mice were euthanized when the tumor volume exceeded 2000 mm³, and survival rates were recorded.

Figure 5:
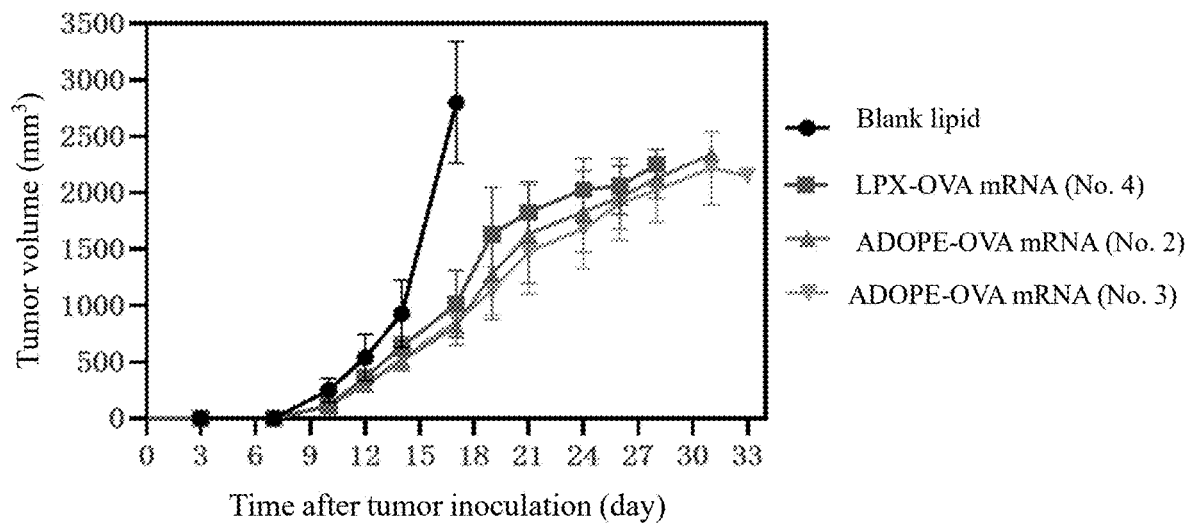
FIG. 5 shows a comparative image of changes in tumor volume of mice after injection of different compositions from No. 1 to 4 in Table 16 in tumor-bearing mice.

Results analysis: As shown in FIG. 5 and Table 17 below, on day 0, B16F10-OVA melanoma cells were subcutaneously inoculated, and vaccinations were administered on day 10, day 13, and day 17 post-tumor inoculation. On day 10 post-tumor inoculation, all groups of mice entered the rapid tumor growth phase. Starting from day 14, compared with the blank lipid control group (No. 1), the ADOPE-containing OVA mRNA composition groups (No. 2 and No. 3) showed significant tumor growth delay, and the tumor sizes were markedly smaller than those of the blank lipid control group. From day 19, compared with the LPX-OVA mRNA group (No. 4), the tumor volumes in the ADOPE-containing OVA mRNA composition groups (No. 2 and No. 3) also demonstrated stronger tumor growth inhibition.

TABLE 17

Tumor growth in mice during tumor treatment with different compositions

| | Tumor volume (mm³) | | | |
|---|---|---|---|---|
| Day n | Blank lipid | ADOPE-OVA mRNA (No. 2) | ADOPE-OVA mRNA (No. 3) | LPX-OVA mRNA (No. 4) |
| 3 | 0.00 | 0.00 | 0.00 | 0.00 |
| 7 | 0.00 | 0.00 | 0.00 | 0.00 |
| 10 | 249.75 | 113.02 | 109.38 | 112.68 |
| 12 | 540.60 | 299.67 | 305.59 | 317.63 |
| 14 | 926.06 | 511.90 | 531.90 | 633.70 |
| 17 | 2800.56 | 817.00 | 861.79 | 1012.82 |
| 19 | / | 1274.91 | 1126.48 | 1630.16 |
| 21 | / | 1631.69 | 1474.92 | 1824.69 |
| 24 | / | 1831.64 | 1682.00 | 2024.57 |
| 26 | / | 1955.71 | 1904.49 | 2058.85 |
| 28 | / | 2122.82 | 2021.07 | 2249.44 |

TABLE 17-continued

Tumor growth in mice during tumor treatment with different compositions

| | Tumor volume (mm³) | | | |
|---|---|---|---|---|
| Day n | Blank lipid | ADOPE-OVA mRNA (No. 2) | ADOPE-OVA mRNA (No. 3) | LPX-OVA mRNA (No. 4) |
| 31 | / | 2342.36 | 2218.15 | / |
| 33 | / | / | 2144.44 | / |

Figure 6:
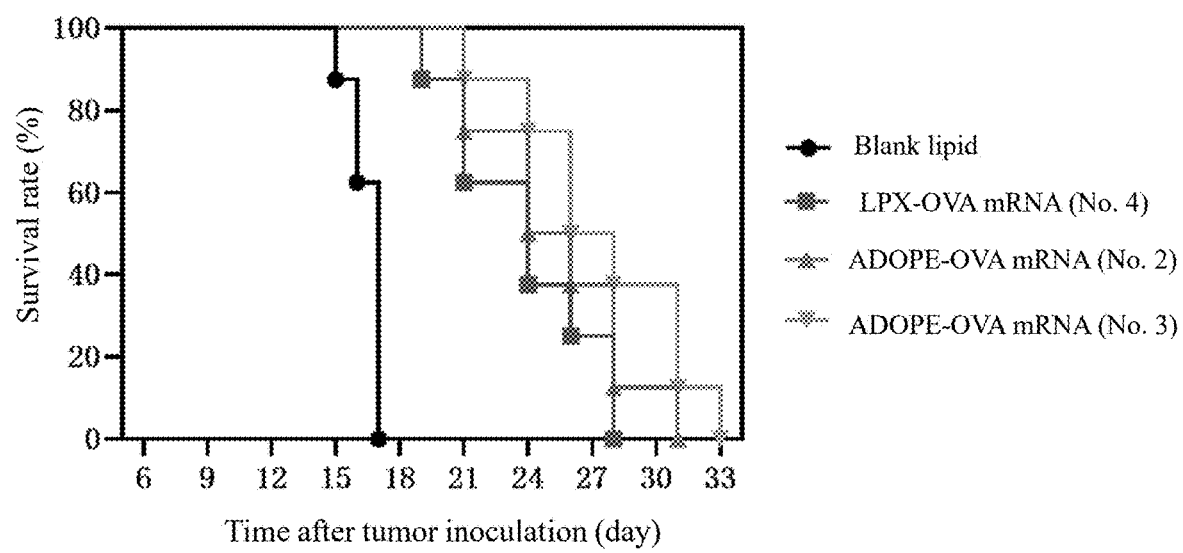
FIG. 6 shows a comparative image of survival rates of mice after injection of different compositions from No. 1 to 4 in Table 16 in tumor-bearing mice.

As shown in FIG. 6 and Table 18, mice in the blank lipid control group began to die on day 15 post-tumor inoculation, with all mice dead by day 17. In the LPX-OVA mRNA control group (No. 4), mice began to die on day 19, with all mice dead by day 28. In the ADOPE-containing OVA mRNA composition groups (No. 2 and No. 3), mice began to die on day 21, with all mice dead by day 31 and day 33, respectively.

significantly enhance the protein expression level (corresponding to the total radiation intensity) of the antigen in the spleen.

TABLE 18

Survival rates of mice during tumor treatment with different compositions

| Day n | Blank lipid | | LPX-OVA mRNA (No. 4) | | ADOPE-OVA mRNA (No. 2) | | ADOPE-OVA mRNA (No. 3) | |
|---|---|---|---|---|---|---|---|---|
| | Number of mouse died on the day | Survival rate | Number of mouse died on the day | Survival rate | Number of mouse died on the day | Survival rate | Number of mouse died on the day | Survival rate |
| 15 | 1 | 87.5% | 0 | 100% | 0 | 100% | 0 | 100% |
| 16 | 2 | 62.5% | 0 | 100% | 0 | 100% | 0 | 100% |
| 17 | 5 | 0 | 0 | 100% | 0 | 100% | 0 | 100% |
| 19 | / | / | 1 | 87.5% | 0 | 100% | 0 | 100% |
| 21 | / | / | 2 | 62.5% | 2 | 75% | 1 | 87.5% |
| 24 | / | / | 2 | 37.5% | 2 | 50% | 1 | 75% |
| 26 | / | / | 1 | 25% | 1 | 37.5% | 2 | 50% |
| 28 | / | / | 2 | 0 | 2 | 12.5% | 1 | 37.5% |
| 31 | / | / | / | / | 1 | 0 | 2 | 12.5% |
| 33 | / | / | / | / | / | / | 1 | 0 |

From the results of Tables 17 and 18, it could be concluded that, compared with the blank lipid control group and the LPX-RNA composition without anionic lipids, the specific composition containing a permanently anionic lipid in the present disclosure could significantly enhance inhibition of tumor growth and improve the survival rate of mice.

Conclusion:

The present disclosure provides a composition comprising RNA encoding one or more antigens as a therapeutic agent and a lipid composition, wherein the lipid composition comprises a permanently anionic lipid, a permanently cationic lipid, and a neutral lipid. The composition prepared by adding permanently anionic lipids has the following characteristics: 1) good particle size with uniform particle distribution; 2) significantly increased protein expression level of the antigen in the spleen; and 3) significantly increased percentage of cells that express the antigen among antigen-presenting cells (e.g., B cells, pDC cells, CDC cells, and macrophages) in the spleen. Specifically:

I. By adding a permanently anionic lipid containing phosphate groups, a composition with good particle size (particle size controlled between 240 and 500 nm) and uniform particle distribution (PDI<0.5) may be obtained.

1. By adding permanently anionic lipids, particularly those containing phosphate groups, including ADOPE, 18PA, DOPG, tetradecylphosphonic acid, farnesyl pyrophosphate, γ,γ-dimethylallyl pyrophosphate, and pA(2'-OMe) mpG, the prepared compositions exhibit good particle size and PDI. ADOPE is the most preferred, with a particle size of 303.1 nm and a PDI as low as 0.2455, indicating good particle uniformity.

2. In contrast, compositions using other types of anionic lipids that do not contain phosphate groups, such as oleic acid, sodium dilaureth-7 citrate, and sodium lauryl sulfonate, result in larger particle sizes exceeding 1000 nm and exhibit solid precipitation, making them unsuitable as mRNA delivery vectors.

II. The composition designed in the present disclosure, which comprises a permanently anionic lipid, a permanently cationic lipid, and a neutral lipid, particularly with a molar percentage ratio of ADOPE, DOTMA, and DOPE controlled within (14 mol % to 33 mol %):(40 mol % to 57 mol %):(22 mol % to 40 mol %), or a charge ratio of 1:2 to 1:5, can 1. In vivo imaging experiments in mice show that the protein expression level of the antigen, delivered by the composition containing a permanently anionic lipid designed in the present disclosure, is significantly higher in the spleen than other organs (e.g., liver, lung). The total radiation intensity of the protein expressed from Fluc-mRNA delivered by the prepared composition in the spleen reaches as high as $1.20 \times 10^7$ to $7.38 \times 10^7$ p/s.

2. Compared with compositions prepared without the addition of anionic lipids, the protein expression of the antigen in the spleen, delivered by the composition designed in the present disclosure, is significantly increased.

For example, the total radiation intensity of the protein expressed from Fluc-mRNA delivered by the mRNA composition designed in the present disclosure in the spleen is as high as 12.10 times that of the composition prepared without the addition of anionic lipids.

3. Compared with LNPs from the prior art, the protein expression of the antigen in the spleen, delivered by the composition designed in the present disclosure, is significantly higher than that of LNPs from the prior art.

For example, the total radiation intensity of the protein expressed in the spleen by the composition designed in the present disclosure is 9.46 times that of the prior art YK-009-mRNA-LNP and 7.10 times that of YK-407-mRNA-LNP.

III. The composition designed in the present disclosure significantly increases the percentage of cells that express the antigen among antigen-presenting cells (e.g., B cells, pDC cells, cDC cells, macrophages) in the spleen.

1. Flow cytometry experiments on mouse spleen cells show that the composition comprising a permanently anionic lipid, as designed in the present disclosure, significantly increases the percentage of cells that express the antigen among antigen-presenting cells (e.g., B cells, pDC cells, cDC cells, macrophages) in the spleen.

For example, the percentage of B cells among antigen-presenting cells is about 0.1 to 0.4%, the percentage of pDC cells is about 2 to 6%, the percentage of cDC cells is about 2 to 9%, and the percentage of macrophages is about 2.4 to 7.5%.

2. Compared with the composition prepared without the addition of anionic lipids, the composition designed in the present disclosure significantly increases the percentage of cells that express the antigen among antigen-presenting cells in the spleen.

For example, in the present disclosure, the percentage of eGFP-expressing B cells, pDC cells, cDC cells, and macrophages is 19 times, 2.8 times, 8.1 times, and 11.8 times, respectively, that of the composition without the addition of anionic lipids.

3. The composition with the specific combination designed in the present disclosure results in a significantly higher percentage of cells that express the antigen among antigen-presenting cells in the spleen compared to other combinations of compositions.

For example, for the composition with the specific combination (permanently anionic lipid ADOPE, permanently cationic lipid DOTMA, neutral lipid DOPE) designed in the present disclosure, the percentage of eGFP-expressing B cells, pDC cells, cDC cells, and macrophages is 4.8 times, 5.6 times, 12.1 times, and 11.6 times, respectively, that of the eGFP RNA composition with pA (2'-OMe) mpG (permanently anionic lipid pA (2'-OMe) mpG, permanently cationic lipid DOTMA, neutral lipid DOPE).

IV. Compared with LPX-RNA compositions without anionic lipids, the composition with the specific combination designed in the present disclosure significantly enhances the ability to stimulate IFN-α cytokine, which proves that the composition of the present disclosure may initiate a robust type I IFN-driven immune stimulation program.

For example, at 6 hours and 24 hours post-injection, the IFN-α cytokine contents in the serum of the composition comprising permanently anionic lipids of the present disclosure are about 1.7 to 4 times and 1.5 to 5 times, respectively, those of the LPX-RNA composition without anionic lipids.

V. Compared with LPX-RNA compositions without anionic lipids, the composition with the specific combination designed in the present disclosure significantly enhances the ability to stimulate antigen-specific cytotoxic T cells, which proves that the composition of the present disclosure may produce a very strong T-cell effect.

For example, on day 13 after the injection of the specific composition containing permanently anionic lipids of the present disclosure, the percentage of OVA antigen-specific CD8 T cells in the total CD8 T cells in the serum is 1.3 to 1.9 times higher than that of LPX-RNA composition without anionic lipids.

VI. Compared with LPX-RNA compositions without anionic lipids, the composition with the specific combination designed in the present disclosure demonstrates a significant effect in controlling tumor growth and prolonging the survival time of tumor-bearing animals in animal experiments.

After subcutaneous inoculation of B16F10-OVA melanoma cells in mice, compared with the blank lipid control group and the control group administered with the LPX-RNA composition without anionic lipids, administration of the composition with the specific combination comprising a permanently anionic lipid designed in the present disclosure effectively delays tumor growth rate, significantly reduces tumor size, and notably increases the survival rate of tumor-bearing mice.

The above is a detailed description of the present disclosure, intended to enable those skilled in the art to understand and implement the present disclosure. However, it should not be construed as limiting the scope of the present disclosure. Any equivalent changes or modifications made based on the spirit and essence of the present disclosure should be encompassed within the scope of protection of the present disclosure.

What is claimed is:

1. A lipid composition consisting of the following components:
   (1) a permanently anionic lipid;
   (2) a permanently cationic lipid;
   (3) a neutral lipid;
   wherein the molar ratio of the permanently anionic lipid, the permanently cationic lipid, and the neutral lipid in the lipid composition is (14 to 33):(40 to 57):(22 to 40);
   the permanently anionic lipid is selected from any one or more of the following:
   2-acetamidoethyl ((R)-2,3-bis (oleoyloxy) propyl) phosphate, 1,2-dioleoyl-sn-glycero-3-phospho-rac-glycerol, or salts thereof;
   the permanently cationic lipid is selected from:
   1,2-di-O-octadecenyl-3-trimethylammonium propane, or salts thereof;
   the neutral lipid is selected from:
   1,2-dioleoyl-sn-glycero-3-phosphoethanolamine or salts thereof.

2. The lipid composition according to claim 1, wherein the lipid composition consists of the following components:
   (1) 25 mol % of the permanently anionic lipid;
   (2) 50 mol % of the permanently cationic lipid; and
   (3) 25 mol % of the neutral lipid;
   or, the lipid composition consists of the following components:
   (1) 20 mol % of the permanently anionic lipid;
   (2) 40 mol % of the permanently cationic lipid; and
   (3) 40 mol % of the neutral lipid;
   or, the lipid composition consists of the following components:
   (1) 14 mol % of the permanently anionic lipid;
   (2) 57 mol % of the permanently cationic lipid; and
   (3) 29 mol % of the neutral lipid;
   or, the lipid composition consists of the following components:
   (1) 33 mol % of the permanently anionic lipid;
   (2) 45 mol % of the permanently cationic lipid; and
   (3) 22 mol % of the neutral lipid.

3. A composition comprising:
   (A) a therapeutic or prophylactic agent comprising one or more of nucleic acid molecules, small molecule compounds, polypeptides, or proteins;
   (B) the lipid composition according to claim 1;
   the composition is used to deliver the therapeutic or prophylactic agent to antigen-presenting cells in target organs;
   the target organ is spleen;
   the antigen-presenting cells comprise one or more of the following: dendritic cells, macrophages, or B cells.

4. The composition according to claim 3, wherein the therapeutic or prophylactic agent is a nucleic acid molecule encoding one or more antigens.

5. The composition according to claim 3, wherein the nucleic acid molecule is capable of eliciting an immune response against disease-associated antigens.

6. The composition according to claim 3, wherein the nucleic acid molecule is capable of eliciting an immune response against cells expressing disease-associated antigens.

7. The composition according to claim 4, wherein the antigen is a disease-associated antigen.

8. The composition according to claim 4, wherein the antigen is capable of eliciting an immune response against disease-associated antigens.

9. The composition according to claim 4, wherein the antigen is capable of eliciting an immune response against cells expressing disease-associated antigens.

10. The composition according to claim 3, wherein the therapeutic or prophylactic agent and the lipid composition are used in an amount such that the charge ratio of net positive to negative charge in the composition is 1:2 to 1:5.

11. The composition according to claim 3, wherein the charge ratio of net positive to negative charge in the composition is 1:2;
or, the charge ratio of net positive to negative charge in the composition is 2:5;
or, the charge ratio of net positive to negative charge in the composition is 1:3;
or, the charge ratio of net positive to negative charge in the composition is 1:5.

12. The composition according to claim 3, wherein the nucleic acid molecule is RNA encoding one or more antigens.

13. The composition according to claim 3, wherein the composition further comprises at least one adjuvant;
or, the composition further comprises one or more excipients;
or, the composition further comprises one or more hydrophobic small molecules, permeability-enhancing molecules, carbohydrates, polymers, surface modifiers, or cytokines.

14. A method for preparing a composition for delivering a therapeutic or prophylactic agent to antigen-presenting cells in target organs, wherein the method comprises:
(a) dissolving a permanently anionic lipid, a permanently cationic lipid, and a neutral lipid in an organic solvent to form a lipid solution, wherein the molar ratio of the permanently anionic lipid, permanently cationic lipid, and neutral lipid is (14 to 33):(40 to 57):(22 to 40), the permanently anionic lipid is selected from any one or more of the following:
2-acetamidoethyl ((R)-2,3-bis (oleoyloxy) propyl) phosphate, 1,2-dioleoyl-sn-glycero-3-phospho-rac-glycerol, or salts thereof;
the permanently cationic lipid is selected from:
1,2-di-O-octadecenyl-3-trimethylammonium propane, or salts thereof;
the neutral lipid is selected from:
1,2-dioleoyl-sn-glycero-3-phosphoethanolamine or salts thereof;
(b) mixing the lipid solution obtained in step (a) with water to obtain a lipid mixture;
(c) mixing the lipid mixture obtained in step (b) with the therapeutic or prophylactic agent to form the composition, wherein the therapeutic or prophylactic agent comprises a nucleic acid buffer solution obtained by dissolving a nucleic acid molecule in a buffer with a pH of 6.8 to 7.6.

15. The method according to claim 14, wherein in step (a), the organic solvent is an alcohol solvent;
or, in step (b), the lipid mixture is capable of passing through a polycarbonate membrane with a pore size of 100 to 400 nm;
or, in step (c), the buffer comprises an aqueous HEPES buffer;
or, in step (c), the nucleic acid molecule is a nucleic acid molecule encoding one or more antigens.

16. The method according to claim 14, wherein in step (a), the organic solvent comprises an alcohol with 1 to 4 carbon atoms;
or, in step (c), the buffer comprises an aqueous HEPES buffer and EDTA;
or, in step (c), the nucleic acid molecule is capable of eliciting an immune response against disease-associated antigens.

17. The method according to claim 14, wherein in step (c), the nucleic acid molecule is capable of eliciting an immune response against cells expressing disease-associated antigens.

18. The method according to claim 15, wherein in step (c), the antigen is a disease-associated antigen.

19. The method according to claim 15, wherein the antigen is capable of eliciting an immune response against disease-associated antigens.

20. The method according to claim 15, wherein the antigen is capable of eliciting an immune response against cells expressing disease-associated antigens.

* * * * *